US008667062B2

(12) United States Patent
Aad et al.

(10) Patent No.: US 8,667,062 B2
(45) Date of Patent: Mar. 4, 2014

(54) METHOD AND APPARATUS FOR PRESERVING PRIVACY FOR APPOINTMENT SCHEDULING

(75) Inventors: Imad Aad, Préverenges (CH); Pentti Valtteri Niemi, Naantali (FI); Anthony Durussel, Lausanne (CH); Emiliano De Cristofaro, Irvine, CA (US); Igor Bilogrevic, Renens VD (CH); Murtuza Jadliwala, Ecublens (CH); Jean-Pierre Hubaux, St-Sulpice (CH)

(73) Assignee: Nokia Corporation, Espoo (FI)

( * ) Notice: Subject to any disclaimer, the term of this patent is extended or adjusted under 35 U.S.C. 154(b) by 343 days.

(21) Appl. No.: 13/032,309

(22) Filed: Feb. 22, 2011

(65) Prior Publication Data
US 2012/0215845 A1 Aug. 23, 2012

(51) Int. Cl.
G06F 15/16 (2006.01)
(52) U.S. Cl.
USPC .......................................................... 709/204
(58) Field of Classification Search
USPC .......................................................... 709/204
See application file for complete search history.

(56) References Cited

U.S. PATENT DOCUMENTS

| 5,124,912 A * | 6/1992 | Hotaling et al. ............. 705/7.19 |
| 7,006,999 B1 * | 2/2006 | Huberman et al. ............. 705/74 |
| 7,679,518 B1 | 3/2010 | Pabla et al. |
| 2005/0102245 A1 | 5/2005 | Edlund et al. |
| 2006/0045030 A1 * | 3/2006 | Bieselin ........................ 370/260 |
| 2006/0045253 A1 * | 3/2006 | Bieselin et al. .......... 379/202.01 |
| 2008/0040184 A1 * | 2/2008 | Cragun et al. .................... 705/8 |
| 2009/0157414 A1 | 6/2009 | O'Sullivan et al. |
| 2009/0164236 A1 * | 6/2009 | Gounares et al. ................. 705/2 |
| 2009/0164784 A1 | 6/2009 | Klassen et al. |
| 2009/0319304 A1 | 12/2009 | Smith |
| 2009/0327019 A1 | 12/2009 | Addae et al. |
| 2010/0010855 A1 | 1/2010 | Cheng et al. |
| 2010/0017216 A1 | 1/2010 | Chakra et al. |
| 2010/0246812 A1 * | 9/2010 | Rane et al. ....................... 380/28 |
| 2011/0015961 A1 * | 1/2011 | Chan ............................... 705/9 |
| 2011/0320235 A1 * | 12/2011 | Bak et al. ..................... 705/7.19 |
| 2012/0136689 A1 * | 5/2012 | Ickman et al. ............... 705/7.19 |

FOREIGN PATENT DOCUMENTS

WO WO 2009/044229 A1 4/2009

OTHER PUBLICATIONS

Amrutkar, et al., "Replacing Oblivious Computation with Private Search for Context Sensitive Communications," Georgia Institute of Technology, May, 2010, pp. 1-12.
Mayer, et al., "appoint—A Distributed Privacy-Preserving iPhone Application," Stevens Institute of Technology, Research and Entrepreneurship Day, 2010, p. 1.

(Continued)

*Primary Examiner* — Larry Donaghue
(74) *Attorney, Agent, or Firm* — Ditthavong Mori & Steiner, P.C.

(57) ABSTRACT

An approach is provided for preserving privacy for appointment scheduling. A scheduling platform receives a request to schedule an appointment among one or more users. The scheduling platform determines availability information for the one or more users from one or more respective devices, wherein the availability information is encrypted using homomorphic encryption. The scheduling platform then processes and/or facilitates a processing of the availability information using, at least in part, one or more homomorphic functions to determine one or more recommended time slots for the appointment.

20 Claims, 17 Drawing Sheets

(56) References Cited

OTHER PUBLICATIONS

Mayer, et al., "Enabling Fair and Privacy-Preserving Applications Using Reconciliation Protocols on Ordered Sets," Stevens Institute of Technology, IEEE, 2011, pp. 1-6.

Chronos: A multi-agent system for distributed automatic meeting scheduling, Zunino, et al., Expert Systens with Applications, 26 (2009), pp. 7011-7018.

* cited by examiner

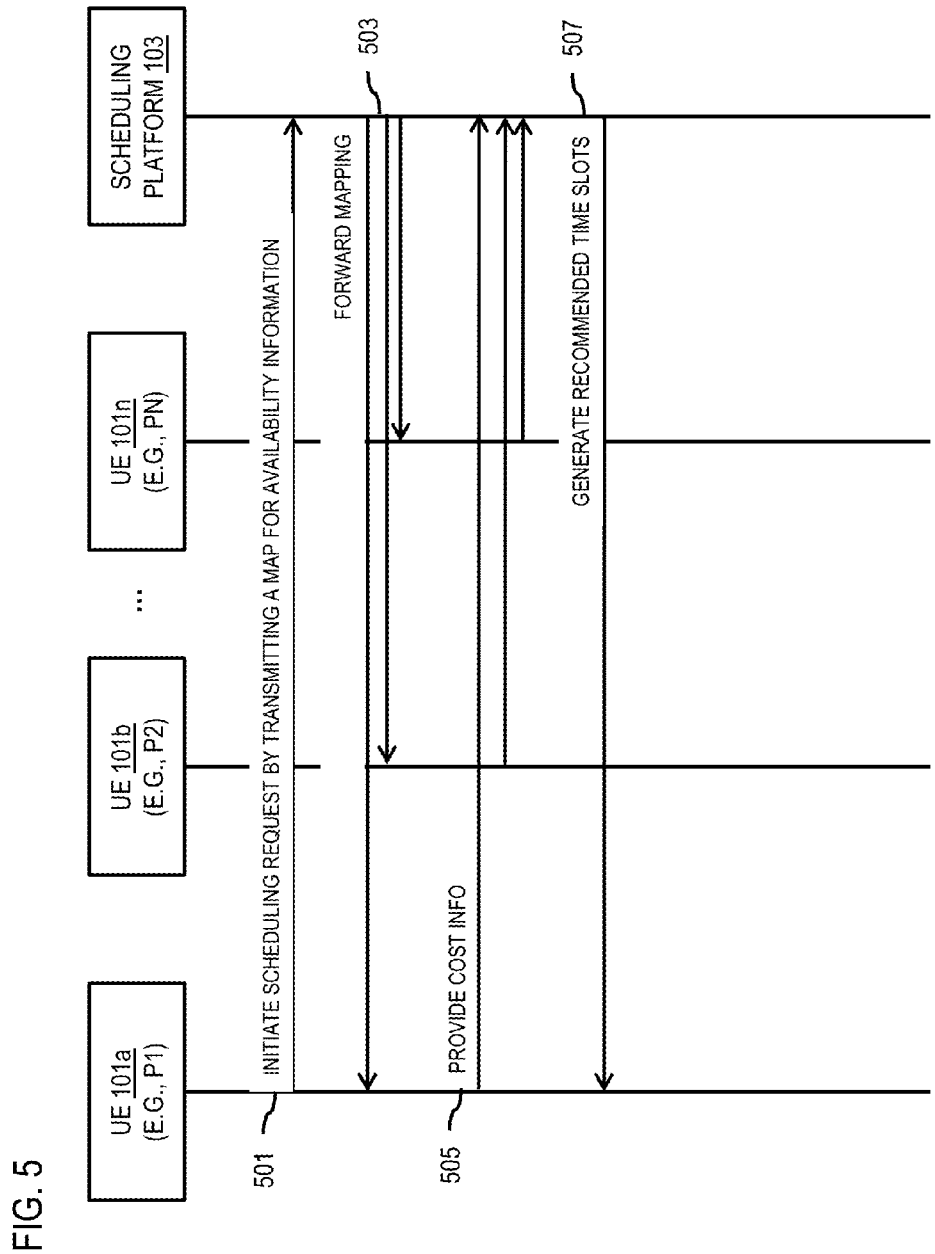

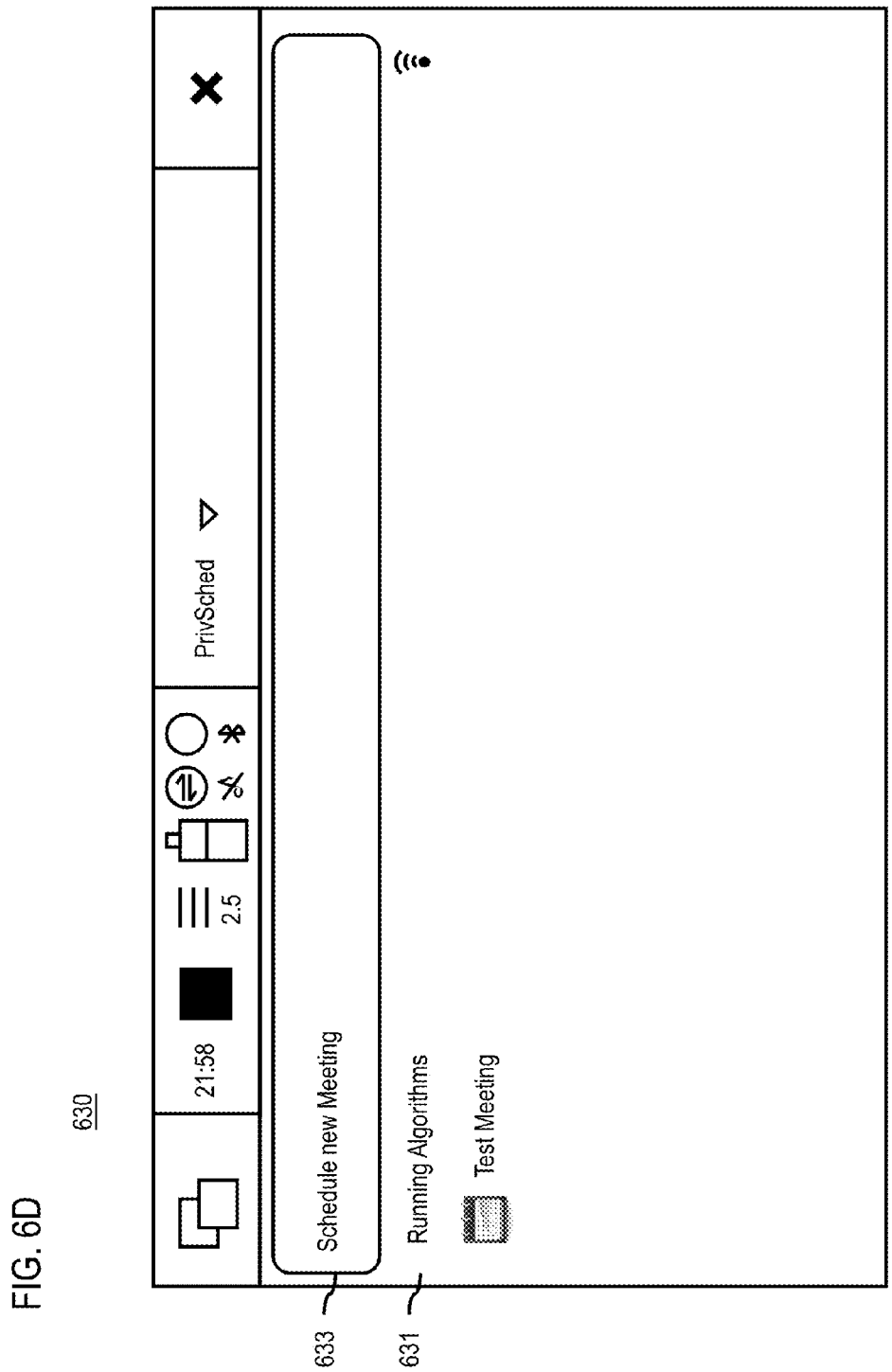

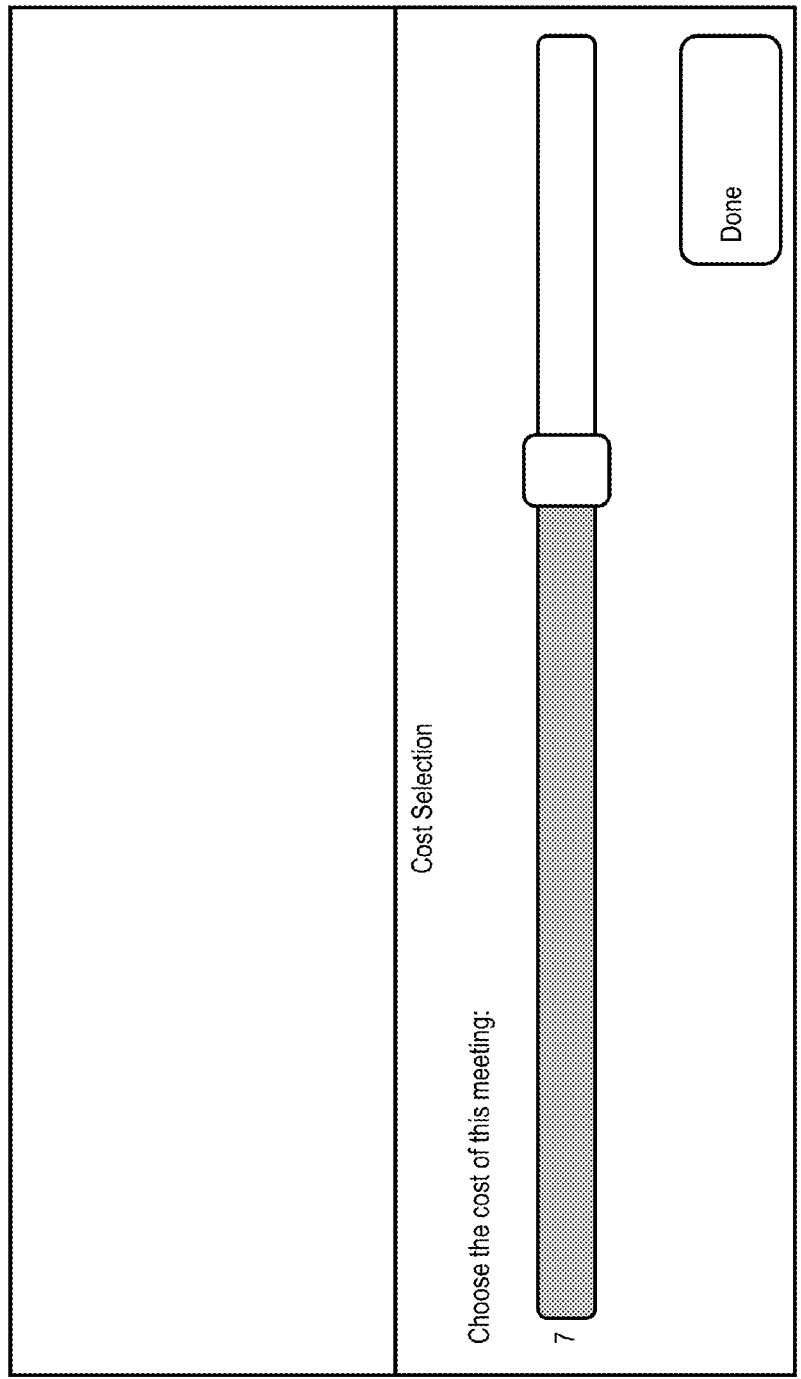

METHOD AND APPARATUS FOR PRESERVING PRIVACY FOR APPOINTMENT SCHEDULING

BACKGROUND

Service providers and device manufacturers (e.g., wireless, cellular, etc.) are continually challenged to deliver value and convenience to consumers by, for example, providing compelling network services. One area of interest has been the development of personal information management (PIM) services and functions (e.g., calendar, contacts, tasks, etc.), particularly for use in mobile devices (e.g.; smartphones, cell phones, portable computers, etc.). For example, equipped with relatively powerful processors and fairly large memory and storage capabilities, such mobile devices can accommodate an increasing number of interactive applications that act on sensitive PIM-related data. The growing amount of sensitive information shared by mobile device users raises privacy concerns. Accordingly, service providers and device manufacturers face significant technical challenges to enabling privacy-preserving mechanisms when dealing with such information. For example, mobile device users have access to context-based services (e.g., social networking, dating, activity-partner searching, etc.) that often involve determining common availabilities for scheduling appointments (e.g., meetings) among the multiple users. In this case, privacy of the scheduling operation can be a concern to users, particularly when such services are provided by third parties or involve users who do not have previously established trust relationships.

SOME EXAMPLE EMBODIMENTS

Therefore, there is a need for an approach for efficiently preserving privacy for appointment scheduling among multiple users.

According to one embodiment, a method comprises receiving a request to schedule an appointment among one or more users. The method also comprises determining availability information for the one or more users from one or more respective devices, wherein the availability information is encrypted using homomorphic encryption. The method further comprises processing and/or facilitating a processing of the availability information using, at least in part, one or more homomorphic functions to determine one or more recommended time slots for the appointment.

According to another embodiment, an apparatus comprising at least one processor, and at least one memory including computer program code, the at least one memory and the computer program code configured to, with the at least one processor, cause, at least in part, the apparatus to receive a request to schedule an appointment among one or more users. The apparatus is also caused to determine availability information for the one or more users from one or more respective devices, wherein the availability information is encrypted using homomorphic encryption. The apparatus is further caused to process and/or facilitate a processing of the availability information using, at least in part, one or more homomorphic functions to determine one or more recommended time slots for the appointment.

According to another embodiment, a computer-readable storage medium carrying one or more sequences of one or more instructions which, when executed by one or more processors, cause, at least in part, an apparatus to receive a request to schedule an appointment among one or more users. The apparatus is also caused to determine availability information for the one or more users from one or more respective devices, wherein the availability information is encrypted using homomorphic encryption. The apparatus is further caused to process and/or facilitate a processing of the availability information using, at least in part, one or more homomorphic functions to determine one or more recommended time slots for the appointment.

According to another embodiment, an apparatus comprises means for receiving a request to schedule an appointment among one or more users. The apparatus also comprises means for determining availability information for the one or more users from one or more respective devices, wherein the availability information is encrypted using homomorphic encryption. The apparatus further comprises means for processing and/or facilitating a processing of the availability information using, at least in part, one or more homomorphic functions to determine one or more recommended time slots for the appointment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-11, 21-31, and 48-50.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a ladder diagram that illustrates a sequence of messages and processes for preserving privacy using parallel scheduling, according to one embodiment;

FIGS. 6A-6I are diagrams of user interfaces utilized in the processes of FIGS. 1-5, according to various embodiments;

DESCRIPTION OF SOME EMBODIMENTS

Examples of a method, apparatus, and computer program for preserving privacy for appointment scheduling are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
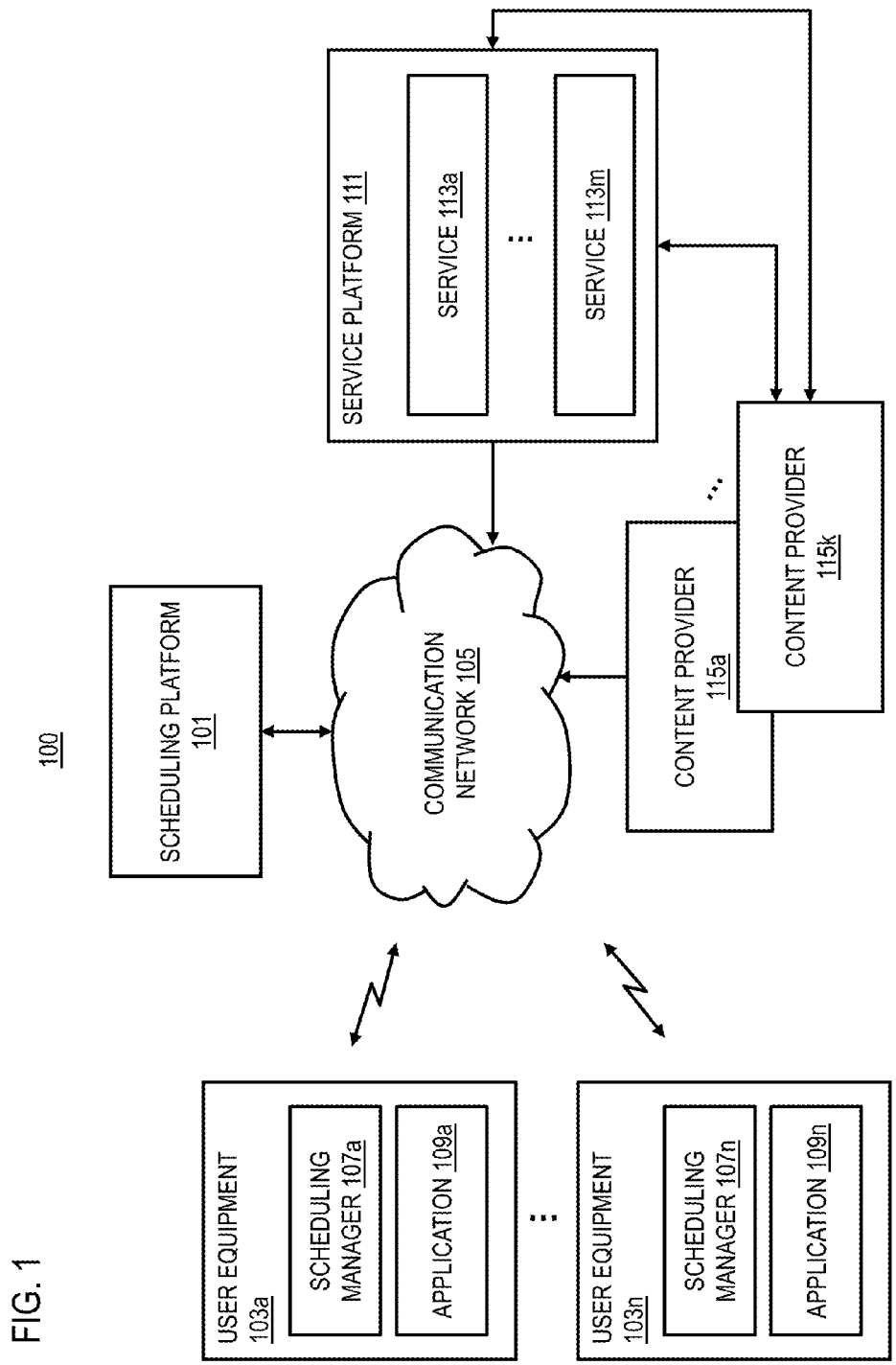
FIG. 1 is a diagram of a system capable of preserving privacy for appointment schedule, according to one embodiment.

FIG. 1 is a diagram of a system capable of preserving privacy for appointment schedule, according to one embodiment. The increasing dependence on anywhere-anytime availability of information has made smartphones commensurably more influential in people's computing ecosystems. Many tasks once performed exclusively on PCs have now branched out to phones and have successfully accommodated device constraints, such as display, connectivity, and power. Smartphone applications are progressively enabling sophisticated interactions among people. By way of example, users can share information for real-time social networking, to discover nearby friends (e.g., location-based services), exchange recommendations, for work-related purposes, etc.

Beneath the proliferation of information exchange lays an extremely rich source of data; e.g., mobile phones, typically accompanying users twenty-four hours a day, learn significant amounts of information about their owners and their environment. Business models behind many of today's free web applications, such as social network websites or search engines, heavily rely on data in the clear, collected from the users and later used to offer context-based services. Yet, as the amount (and sensitiveness) of shared information increases, so do privacy concerns.

For example, applications such as Microsoft Outlook, Apple iCal, and Nokia Ovi are available on mobile devices, and they all offer time and activity management services. One desirable feature in such applications is activity scheduling: e.g., colleagues can schedule meetings at common available time slots, groups of friends can organize parties on weekends, and people unbeknownst to each other can engage in dating or other common activity based on their common free/busy hours. However, one concern in such scheduling applications is that users would prefer not to share all personal information with everyone. For example, they may only want to share common availabilities, but not details about other records. They may also have reservations about sharing personal information with third-party service providers. Therefore, privacy of personal information, vis-à-vis service providers and peers, can influence the adoption and use of such scheduling applications.

More specifically, traditional methods for scheduling a meeting or appointment (e.g., finding a common available time among multiple parties) typically requires that all participants reveal their availability information during a given period of time. The longer this period is, the higher are the changes to find a common timeslot without too many interactions between the participants and/or the scheduling server. However, revealing or sharing a user's availability over a long time range or period (e.g., in order to facility the scheduling task) can be misused to infer private information about the user such as affiliation, religion, culture, etc.

To address these concerns, a system 100 of FIG. 1 introduces a capability to use homomorphic functions so that potential meeting participants can protect the privacy of their availability information from each other and/or the scheduling server, while still being able to find recommended timeslots for scheduling a requested appointment or meeting. In other words, the system 100 enables users to determine available time slots for scheduling a common appointment among the users without revealing any other information to other participating users or other components of the system 100 (e.g., a central scheduling server such as a scheduling platform 101). In one embodiment, the system 100 uses secure and efficient cryptographic techniques assisted by a semi-trusted server (e.g., the scheduling platform 101), which acts as a common scheduling service. As used herein, the term semi-trusted indicates that the scheduling platform 101 is not trusted with participants' clear data itself (i.e., it learns no information about users' inputs or outputs). Instead, the scheduling platform 101 obtains and/or processes encrypted data and is trusted only to the extent that the scheduling platform 101 will not collude with other parties to defeat the encryption. As a result, in one embodiment, the scheduling platform 101 can be implemented by public services without disclosing any data in the clear.

In one embodiment, the system 100 uses privacy-preserving scheduling algorithms that take advantage of the homomorphic properties of asymmetric cryptosystems. By way of example, homomorphic cryptosystems are ones where mathematical operations on the ciphertexts have regular effects on the plaintexts. In other words, functions applied to homomorphically encrypted data results in application of the same the functions to the underlying data without exposing the underlying to the component performing the functions. By way of example, homomorphic cryptosystems include, but are not limited to, the Paillier Cryptosystem (e.g., E(m1)*E(m2)=E (m1+m2); E(m)$^d$=E(m*d); E$_{r1}$(m)≠E$_{r2}$(m)), the Boneh-Goh-Nissim Cryptosystem (e.g., undefined number of homomorphic additions; and one and only homomorphic multiplication).

In one embodiment, the scheduling platform 101 also serves to minimize the overhead resource burden incurred by mechanisms for privacy protection in applications executing locally at users devices (e.g., user equipment (UE) 103a-103n, also collectively referred to as UEs 103). In addition, the central scheduling platform 101 provides a centralized approached to protecting privacy to overcome, for instance, communication and/or computational complexities associated with at least some distributed approaches. In other words, potentially heavy computations associated with manipulating homomorphically encrypted data to determine scheduling information can shifted from the UEs 103 (e.g., with comparatively less computing resources) to the scheduling platform 101. It is noted, however, that although the various embodiments of the approach are described herein with respect to a centralized server (e.g., the scheduling platform 101), it is contemplated the various embodiment also apply to an approach where the functions of the centralized can be perform, at least in part, may any one or more of the participant devices (e.g., the UEs 103).

As shown in FIG. 1, the system 100 comprises the UEs 103 have connectivity to the scheduling platform 101 via the communication network 105. In this example, the UEs 103 are associated with and represent respective participating users. As previously noted, the participating UEs 103 are typically mobile phones with relatively small computational resources. In one embodiment, the UEs 103 including respective scheduling managers 107a-107n (also collectively referred to as scheduling managers 107) to interface with the scheduling platform 101 and/or to perform all or portion of the various embodiments of the privacy-preserving scheduling processes described herein. For example, scheduling managers 107 may compute respective homomorphic encryption keys (e.g., a Paillier keypair (pubK+privK)) for use in the processes of the system 100.

In addition, the UEs 103 may also execute one or more applications 109a-109n (also collectively referred to as applications 109) that maintain availability information (e.g., in a calendar) and/or request scheduling of multiparty appointments (e.g., meetings). In one embodiment, the availability information is binary availability information (e.g., availability information indicates that a user either available or not available at a particular time slot). In addition or alternatively, the availability information can be non-binary availability information wherein availability is described with respect to a scale representing various degrees from available or not available for a particular time slot. By way of example, non-binary availability may be indicated as a scale from 0 to $c_{max}$ (e.g., 10) with 0 representing completely available and $c_{max}$ representing completely unavailable. Values in between 0 and 10 can then represent different degrees or the likelihood that a particular user might be available for an appointment at a particular time slot. For example, a value of 2 indicates that a user is more likely to attend an appointment than a value of, for instance, 7. As another example, non-binary availability information may include the carbon footprint or the gas cost to reach a given destination, or how much a user is tied to a busy timeslot (e.g., whether the user can break another appointment).

In one embodiment, the scheduling platform 101 can use one or more cost functions to process non-binary availability information and recommended potential time slots for scheduling a multiparty appointment. For example, the cost functions may evaluate one or more cost ratings that are, for instance, specified or determined for time slots over a requested meeting time range. The cost functions then recommend the time slots based on processing of the cost ratings. By way of example the cost functions may represent any number of factors that might influence attendance of a meeting including, for example, cost parameters such as time of day, proximity to other meetings, costs of travel, meeting resource requirements, importance of the meeting, etc.

In one embodiment, the cost functions and/or associated costs parameters may be determined by context information, profile information, etc. associated with one or more of the users. For example, if context information indicates that a potential participant is on vacation, the cost ratings assigned or applied to work time slots during the vacation would be relatively high. In some embodiments, instead of setting the cost ratings, parameters, or functions based on context, the user may simply select a profile to indicate or other modify availability information. For example, the user may download a profile that is designed for sports fans. In this case, whenever a sports event is taking place, the user's availability information would indicate relatively high cost ratings or parameters. These cost ratings and parameters can then be processed by the scheduling platform 101 (e.g., using the one or more cost functions) to compute a recommended time slot for a particular meeting. For example, the scheduling platform 101 can use one or more homomorphic functions (e.g., homomorphic minimization) to aggregate the costs information from the cost functions and then recommend time slots which minimize the aggregated costs. Furthermore, homomorphic functions are used to preserver user privacy.

In one embodiment, the scheduling platform 101 may also recommend one or more potential locations for holding the meeting. By way of example, this analysis may also be performed by analyzing the availability information against one or more cost functions. In this case, the cost functions include, at least in part, parameters to evaluate travel requirements and/or costs. For example, if a potential meeting participant already as a meeting scheduled in Paris, France on a particular day, the cost rating for attending a meeting in New York City in the United States the next day would be relatively high.

In one embodiment, the applications 109 can be clients of the service platform 111 and/or the services 113a-113m (also collectively referred to as services 113) of the service platform 111. By way of example, the service platform 111 and/or the services 113 may provide or otherwise use one or more calendar services, scheduling services, PIM services, and/or related services (e.g., online calendars, social network services, matching services, dating services, etc.). In some embodiments, the service platform 111 and/or the services 113 provide content (e.g., event information, calendar information, availability information, etc.) from the one or more of the content providers 115a-115k.

In the example of FIG. 1, it is assume that there are N users u, (e.g., corresponding to the UEs 103a-103n), i∈{1 ... N}, that want to schedule an appointment or activity (e.g., meeting, party) at a common available time slot. Each user has a private schedule $x_i$ represented, for instance, by a string of bits $x_i = [b_{i,1}, b_{i,2} ... b_{i,m}]$, where each bit $b_{i,j} \in \{0,1\}$ expresses the availability of user $u_i$ in a particular time slot j, $b_{i,j}=1$ means that user $u_i$ is available at time slot j, whereas $b_{i,j}=0$ means that the user is not available. It is also assumed that the length m of $x_i$, (e.g., the time horizon or range of the individual schedules, is substantially constant or at least overlaps for the users). In one embodiment, the value of m can either be predecided by the participants or fixed by the requesting application 109.

Moreover, in one embodiment, the UEs 103 are able to perform public key cryptographic operations and that they have connectivity to the scheduling platform 101 for performing the scheduling computations. In this case, the scheduling platform 101 also is able to run public key cryptographic operations as well. For instance, a common public key infrastructure is the RSA cryptosystem. In one embodiment, communications between the UEs 103 and the scheduling platform 101 is encrypted with the latter's public key for the purposes of confidentiality of the availability information (e.g., the schedules) with respect to other users, for authentication and integrity protection. Thus, all UEs 103 know the public key of the scheduling platform 101 but only the scheduling platform 101 knows the corresponding private key.

In another embodiment, the UEs 103 share a common secret, which is used to derive (1) a fresh common key pair $(K_P, K_s)$, where KP is the public key and Ks is the private key, and (2) a fresh bit permutation function $\sigma=[\sigma_1, \ldots, \sigma_m]$ before initiating the scheduling operation. In one embodiment, this could be achieved, for example, through a secure credential establishment protocol. Thus, these keys and permutations are derived and known to the UE 103 but not to the scheduling platform 101. In one embodiment, the encryption of a message M with the group public key is referred to as $E_{K_P,r}(M)=C$, wherein r is a random integer, and the decryption of the encrypted message C as $D_{K_s}(C)=M$. In one embodiment, the permutation $\sigma$, is used to randomize the order of bits sent to the scheduling platform 101. This prevents the scheduling platform 101, for instance, from gaining any knowledge about which time slot is being evaluated in each computation, thereby preserving user privacy.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television, radio, electronic book device, game device, or any combination thereof with sending and receiving capabilities over the communication network 105. It is also contemplated that the UE 103 can support any type of interface to the user (such as "wearable" circuitry, etc.).

By way of example, the UE 103 and the scheduling platform 101 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the scheduling managers 107 interact with the scheduling platform 101 according to a client-server model. According to the client-server model, a client process sends a message including a request to a server process, and the server process responds by providing a service (e.g., messaging, advertisements, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
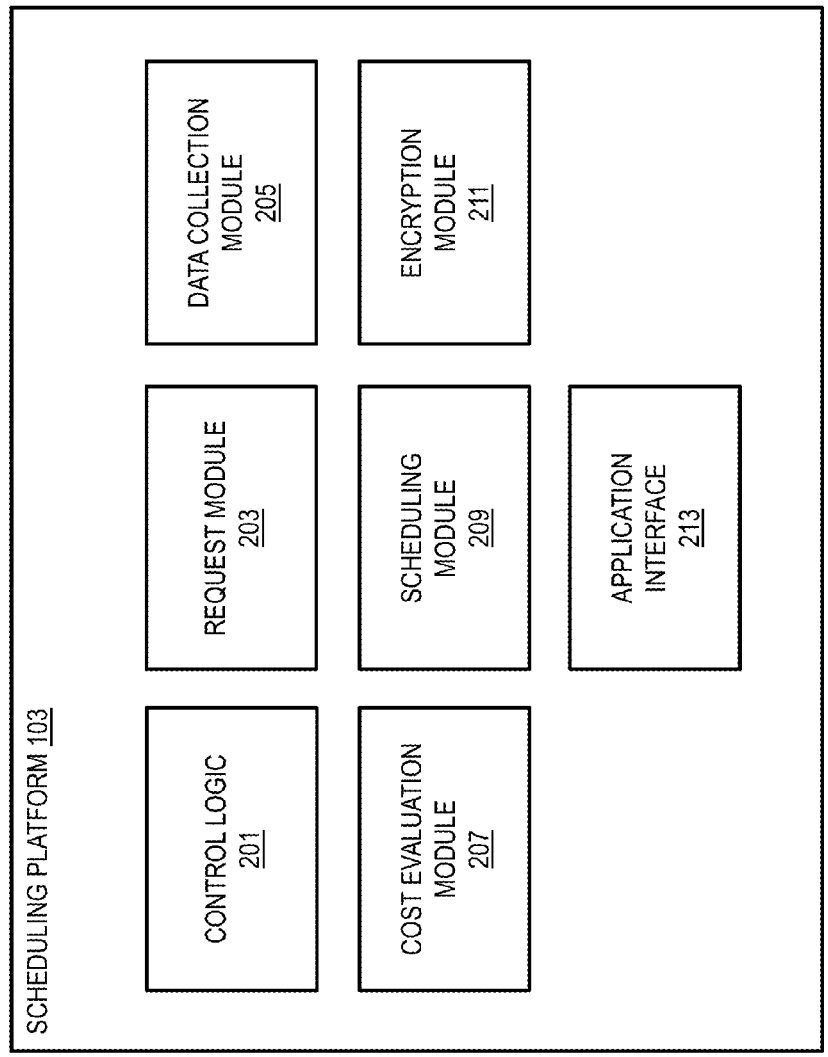
FIG. 2 is a diagram of the components of scheduling platform, according to one embodiment.

FIG. 2 is a diagram of the components of scheduling platform, according to one embodiment. By way of example, the scheduling platform 101 includes one or more components for preserving privacy for appointment scheduling. It is contemplated that the functions of these components may be combined in one or more components or performed by other components of equivalent functionality. In this embodiment, the scheduling platform 101 includes a control logic 201, a request module 203, a data collection module 205, a cost evaluation module 207, a scheduling module 209, an encryption module 211, and application interface 213.

The control logic 201 executes at least one algorithm for performing one or more functions of the scheduling platform 101. For example, the control logic 201 interacts with the request module 203 to determine or otherwise receive one or more requests to determine recommended time slots and/or locations for a multiparty appointment. As previously discussed the one or more request for scheduling a multiparty appointment can be initiated by one or more applications 109 executing on a UE 103 associated with an initiating user. In one embodiment, the request can include, for instance, identification of one or more invitees or potential meeting participants and their respective UEs 103.

The request module 203 then interacts with the device data collection module 205 to determine availability information from the potential participants. For example, the data collection module 205 may initiate a request for a range of time slots and the corresponding user availabilities. As previously noted, the availability information may be provided as either binary availability (e.g., available or not available, suitable or not suitable, etc.) or a non-binary information which reflect a range or continuum of cost values over one or more cost parameters (e.g., available resource, personal preference, importance, etc.). In one embodiment, the data collection module 205 may compile historical behavior with respect to previously scheduled appointments (e.g., acceptance and/or attendance patterns) and related information about the appointment (e.g., type of appointment, location, identities of other participants, purpose, etc.) to infer or automatically calculate estimated cost ratings for each time slot.

After obtaining availability information, the cost evaluation module 207 can process and/or facilitate a processing of the availability information including cost ratings to recommend one or more time slots and/or locations for a requested appointment. For example, the cost evaluation may include applying one or more cost functions to evaluate and/or determine the cost ratings for individual users and/or for the potential timeslots. In one embodiment, the cost evaluation module 207 can evaluate the availability/cost information using one or more homomorphic functions to process an encrypted form of the information without exposing underlying content (e.g., to preserve user privacy).

The scheduling module 209 can then process the cost evaluation (e.g., resulting in aggregated cost information for a number of potential candidate time slots and/or locations) to determine recommended time slots with minimum costs or costs below predetermined threshold values. In one embodiment, the recommended time slots can be based on an earliest available time slot or other criteria such as least costly for at least a certain percentage or number of the potential participants. For example, a time slot may be recommended if it is least costly for at least eight of ten participants.

The scheduling platform 101 also includes an encryption module to can include one or more cryptosystems to process homomorphically encrypted information (e.g., availability information from the UEs 103). In one embodiment, the encryption module 211 can also encrypt and/or maintain the encryption of the output of the scheduling platform 103. In this way, the scheduling platform 101 itself may remain unaware of the actual contents of the encrypted availability information that it has processed to recommend one or more timeslots and/or locations. In one embodiment, application of homomorphic functions to determine the recommend timeslots can also hide the output of the scheduling platform 101 from the platform 101 itself. As a result, privacy of availability information from the UEs 103 can be protected even from the platform trusted to process the information, thereby preserving user privacy.

Finally, in one embodiment, the scheduling platform 101 includes an application interface 213 (e.g., an application programming interface (API)) for interacting with one or more applications 109, the service platform 111, the services 113, the content providers 115, and/or other entities with connectivity over the communication network 105.

Figure 3:
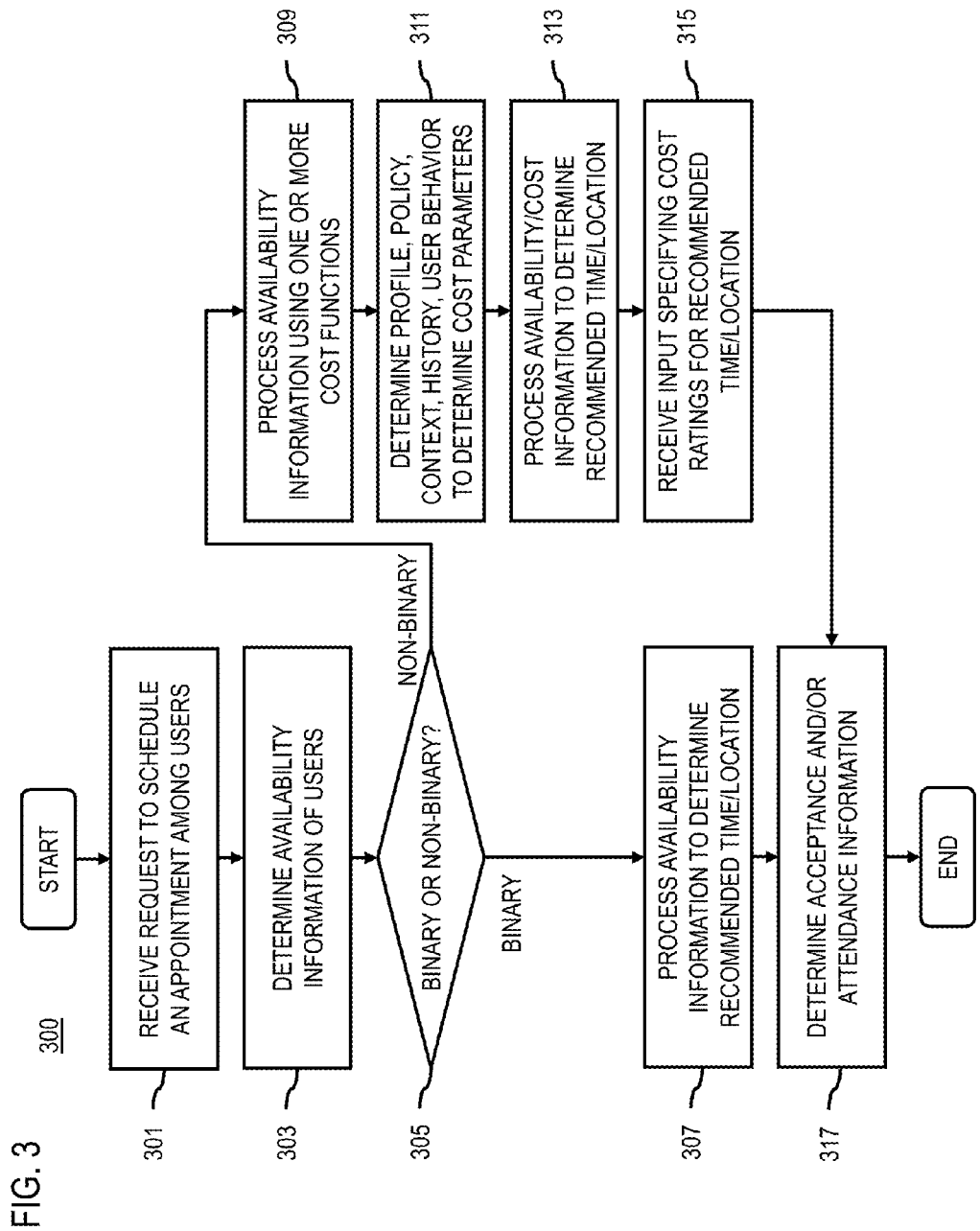
FIG. 3 is a flowchart of a process for preserving privacy for appointment scheduling, according to one embodiment.

FIG. 3 is a flowchart of a process for preserving privacy for appointment scheduling, according to one embodiment. In one embodiment, the scheduling platform 101 performs the process 300 and is implemented in, for instance, a chip set including a processor and a memory as shown FIG. 8. In addition or alternatively, all or a portion of the process 300 can be performed by the scheduling manager 107 and/or the application 109. The process 300 describes a general overview of one embodiment of the process. Additional details of various embodiments of the scheduling processes are provided in the discussions with respect to FIGS. 4 and 5 below.

In step 301, the scheduling platform 101 receiving a request to schedule an appointment among one or more users. As noted above, the request may be generated by the application 109, the service platform 111, the services 113, or a combination thereof. The scheduling platform 101 then determines availability information for the one or more users from one or more respective devices, wherein the availability information is encrypted using homomorphic encryption (step 303).

Next, the scheduling platform 101 determines whether the availability information is binary information or non-binary information (step 305). If the availability information is binary, the scheduling platform 101 processes and/or facilitates a processing of the availability information using, at least in part, one or more homomorphic functions to determine one or more recommended time slots and/or locations for the appointment (step 307) in order to preserve user privacy.

If the availability information is non-binary, the scheduling platform 101 processes and/or facilitates a processing of the availability information using one or more cost functions to determine the one or more recommended time slots (step 309). In one embodiment, one or more parameters of the one or more cost functions include, at least in part, a user cost rating for attending the appointment, a resource level associated with attending the appointment, an importance level of the appointment, a location of the appointment, or a combination thereof.

In one embodiment, the scheduling platform 101 also determines a profile, a policy, or a combination thereof associated with the at least one of the one or more users (step 311). By way of example, users may download or otherwise acquire the profile to more easily set or define cost ratings or cost information for the users' time slots. The profile, for instance, contains or specifies a default set of cost ratings based on, for instance, typical characteristics associated with a particular type of user. In addition or alternatively, users may manually specify cost ratings and/or parameters for processing by the scheduling platform 101, or the scheduling platform 101 may monitor the user's behavior, context, etc. to learn and/or infer the users' cost ratings.

The scheduling platform 101 then processes and/or facilitates a processing of the profile, the policy, or a combination thereof to determine or to modify one or more parameters of the one or more cost functions. In one embodiment, policies may define rules for specifying cost ratings. For example, a policy may state that costs should be increased for time slots close to the end of the business day or that overlap with lunch breaks. Other policies may provide for elevated costs if there are certain other attendees that will be present at the meeting. It is contemplated the scheduling platform 101 can operate under any number of policies that serve to either raise or lower the cost ratings and/or parameters.

In another embodiment, the scheduling platform 101 may also determine context information, historical appointment information, user behavior information, or a combination thereof associated with at least one of the one or more users to determine or modify the cost parameters and/or cost information. For example, historical appointment information may include information on what meetings a user typically attends and at what times, etc. In this way, the scheduling platform 101 can learn a user's costs associated with candidate time slots.

In step 313, the scheduling platform 101 processes and/or facilitates a processing of the availability information and the cost information using, at least in part, one or more homomorphic functions to determine one or more recommended time slots for the appointment. In this case, use of homomorphic functions enables the scheduling platform 101 to preserve user privacy. In one embodiment, the scheduling platform 101 can also receive or determine one or more threshold criteria for the one or more cost functions or more threshold criteria for the one or more cost functions and/or cost information. The threshold criteria are then used to select or determine one or more recommended timeslots and/or locations.

In one embodiment, the scheduling platform 101 can also receive an input from at least one of the one or more users for specifying one or more cost ratings of the one or more recommended time slots. This cost rating can represent, for instance, user feedback on the value or usefulness of the recommended timeslots. Accordingly, the scheduling platform 101 can process and/or facilitate a processing of the inputted one or more cost ratings to determine one or more cost parameters for one or more subsequent applications of the one or more cost functions (step 315). In addition, the scheduling platform 101 can determine acceptance information, attendance information, or a combination thereof of the appointment. The scheduling platform 101 can then process and/or facilitate a processing of the acceptance information, attendance information, or a combination thereof to determine or to modify one or more parameters of the one or more cost functions.

Figure 4:
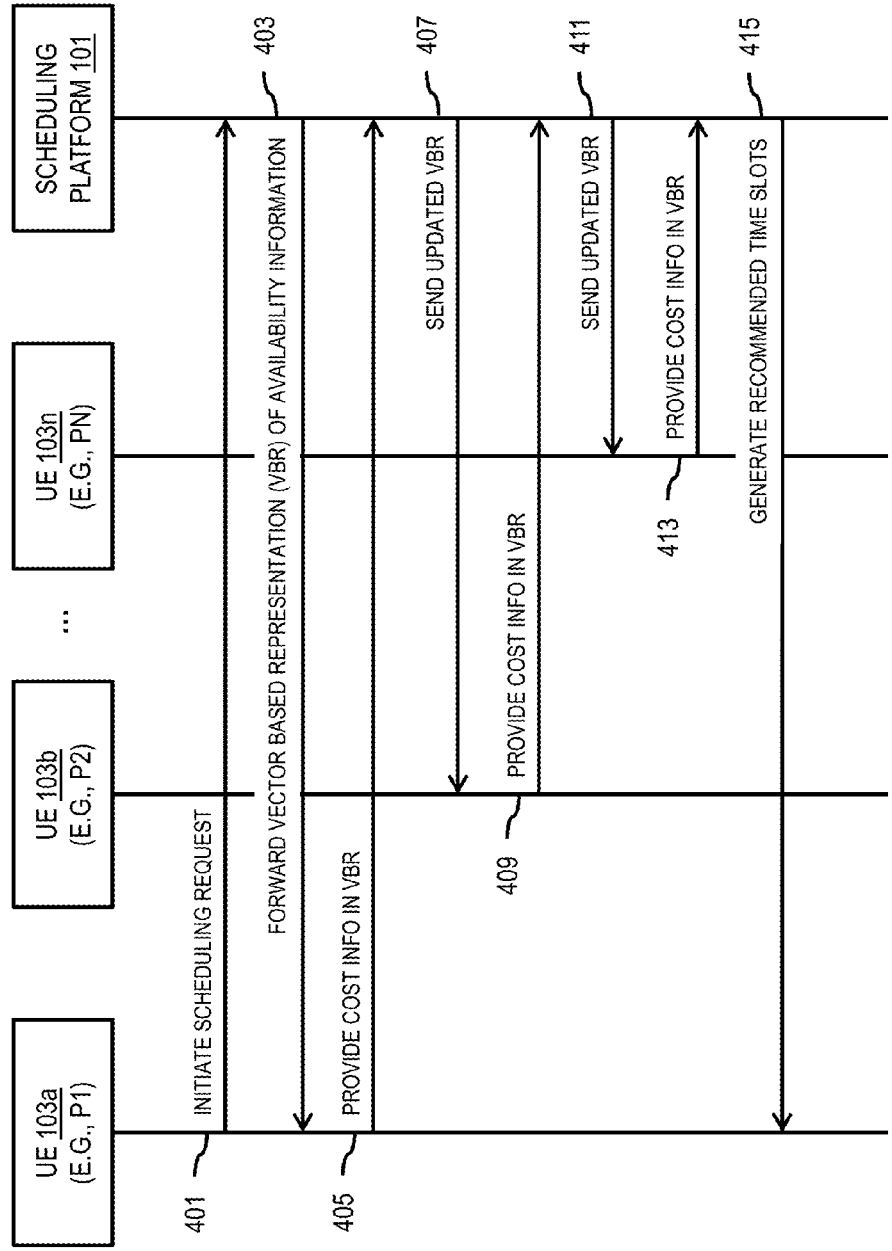
FIG. 4 is a ladder diagram that illustrates a sequence of messages and processes for preserving privacy using sequential scheduling, according to one embodiment.

FIG. 4 is a ladder diagram that illustrates a sequence of messages and processes for preserving privacy using sequential scheduling, according to one embodiment. A network process is represented by a thin vertical line. A step or message passed from one process to another is represented by horizontal arrows. The processes represented in FIG. 4 are the participating UEs 103a-103n and the scheduling platform 101.

In one embodiment, privacy-preserving scheduling involves N different participants, UEs 103a-103n respectively labeled as $P_1$ to $P_N$. In this example, $P_1$ is the Initiator of the protocol. Moreover, each $P_i$ (for $i \in [1,N]$) maintains a private calendar, divided into divided into m timeslots. Typical timeslot guarantees are 30 or 60 minutes (but this can be tuned according to users' preferences). Each $P_i$ assigns a cost $c_{i:j}$ ($0 \leq c_{i:j} \leq c_{max}$), for each timeslot $j \in [1,N]$ (e.g., ranging from 0 to 10). In one embodiment, the process of FIG. 4 relies on the Paillier Cryptosystem, a public-key probabilistic encryption scheme that provides additive homomorphism—i.e., the product of two ciphertexts decrypts to the sum of the corresponding plaintexts. By way of example, additively homomorphic cryptosystems, such as Paillier, can be used to compute homomorphic minimization (or maximization), i.e., one can find the minimum of some integers while operating on ciphertexts only, thus, without learning any information on those integers.

The process of FIG. 4 extends this technique to obtain the homomorphic argmin, i.e., to additionally find which integer corresponds to the minimum. In addition, the process of FIG. 4 uses a tagging system based on, for instance, powers of 2. The process of FIG. 4 also encodes integers in a unary system. In other words, to represent an integer X, the process of FIG. 4 repeats X times encryptions of 0's. In one embodiment, this encoding technique uses a vector-based representation (vbr):

$$x \xrightarrow{vbr} \vec{X} = [\underbrace{E(0), \ldots, E(0)}_{x\, times}, E(1), E(z), \ldots, E(z)]$$

By way of example, $E(\cdot)$ denotes encryption using Paillier, and z a random number in the Paillier setting. In one embodiment, this is used for padding. Then, the process of FIG. 4 raises each element of the vbr to the value of a tag—a power of 2. In one embodiment, the tagging is performed on ciphertexts, rather than plaintexts. After tagging, E(0) remains E(0), while E(1) becomes E(tag): this enables identification of which value corresponds to the minimum, after the homomorphic minimization is performed. In one embodiment, the vector $\vec{X}$ is large enough to contain possible domain values. Moreover, since the Paillier cryptosystem is probabilistic—the elements $E(\cdot)$ (and the vectors too) are mutually computationally indistinguishable and do not reveal any information about plaintext values.

At step 401, the Initiator $P_1$ generates Paillier public and private keys, denoted with $PK_1$ and $SK_1$, respectively. In one embodiment, encryptions/decryptions are performed using these keys. Note that, randomness used by the encryption algorithm is specified using the following notation: E(M,R) to denote encryption of M under $PK_1$ using the random value R).

Next, $P_1$ computes, for each time slot $j \in [1,m]$, the $\vec{v_j}$:

$$\vec{v_j} = [\underbrace{E(0), \ldots, E(0)}_{c_{1:j}}, \underbrace{E(1), E(z), \ldots, E(z)}_{r - c_{1:j}}]$$

Finally, $P_1$ sends $\{\vec{v_1}, \ldots, \vec{v_m}\}$, along with the identities of the other participants to S (e.g., the scheduling platform 101).

After receiving the initial input from $P_1$ the server S sequentially forwards $\{\vec{v_1}, \ldots, \vec{v_m}\}$ to each participant involved in the protocol (steps 403, 407, and 411).

Next (steps 405, 409, and 413), each $P_i$ (for $i \in [2,N]$) adds the respective participant's cost $c_{i:j}$ to each vector $\vec{v_j}$ (for $j \in [2,N]$) by shifting the elements of each vector $c_{i:j}$ positions right, and replacing them by E(0):

$$\vec{v_j} \leftarrow \vec{v_j} >> c_{i:j} \stackrel{def}{=} [\underbrace{E(0), \ldots, E(0)}_{c_{i:j}}, v_{j,1}, \ldots, v_{j,r-c_{i:j}}]$$

To mask the participants' modifications, $P_i$ re-randomizes the vectors $\vec{v_j}$'s by multiplying the generic element $v_{j,k}$ by a random $E(0)$. Finally, the participants send the updated $\{\vec{v_1}, \ldots, \vec{v_m}\}$ back to S. As shown, this phase is repeated, sequentially, for each participant, $P_2, \ldots, P_N$. At the end of the phase (step 413), S obtains the final $\{\vec{v_1}, \ldots, \vec{v_m}\}$ where, for $j \in [1,m]$:

$$\vec{v_j} = [\underbrace{E(0), \ldots, E(0)}_{ac_j}, \underbrace{E(1), E(z), \ldots, E(z)}_{\tau - ac_j}]$$

Upon receiving the final $\{\vec{v_1}, \ldots, \vec{v_m}\}$, S computes the homomorphic argmin. First, S raises each element of $\vec{v_j}$ to $2^j$. Then, S computes a vector $\vec{q}$. In one embodiment, the sum of all tags should not exceed the size of the Paillier modulus.

$$\vec{v'_j} = (\vec{v_j})^{2^j} = [(v_{j,1})^{2^j}, (v_{j,2})^{2^j}, \ldots, (v_{j,\tau})^{2^j}]$$

$$\vec{q} = [q_1, q_2, \ldots, q_\tau]$$

$$\stackrel{def}{=} \left[ \prod_{j=1}^{m} v'_{j,1}, \ldots, \prod_{j=1}^{m} v'_{j,\tau} \right] =$$

$$= [\underbrace{E(0), \ldots, E(0)}_{min}, q_{min+1}, \ldots, q_\tau]$$

At step 415, S sends $\vec{q}$ to the Initiator $P_1$, that decrypts each element of $\vec{q}$ using $SK_1$. In one embodiment, the minimum aggregated cost corresponds to the number of consecutive 0's in the first positions of $\vec{q}$. Also, $q_{min+1}$ decrypts to the sum of tags corresponding to the timeslot(s) producing the minimum aggregated cost. In one embodiment, this sum is denoted with $\phi$. $P_1$ retrieves the index of this timeslot by observing which bits are equal to 1 in the binary decomposition of $\phi$. $P_1$ may additionally retrieve the second minimum timeslot by subtracting ($\phi \cdot z$) from the non-null decrypted elements of $\vec{q}$. In one embodiment, iterating this method leads to retrieval of all timeslots with aggregated cost less than $\tau$.

In one embodiment, that $\tau$ (e.g., cost threshold value) is a system parameter and can be tuned to meet different requirements. For example, smaller values of $\tau$ result into a smaller $\vec{q}$ vector: this would reduce computations performed by participants and by the server, as well as the total bandwidth overhead. Also, the knowledge of $P_1$ on aggregated cost values can be limited to fewer timeslots, while the likelihood that the protocol execution terminates with no suitable timeslot would be increased. Therefore, an appropriate choice of $\tau$ depends on the specific setting and should be agreed on by the participants. In one embodiment, at the end of the protocol, only $P_1$ learns the timeslots with aggregated cost smaller than the threshold, and takes appropriate actions to schedule a meeting. In one embodiment, standard encryption techniques can be used by $P_1$ to multicast the meeting invitation to the other participants.

In one embodiment, during each protocol execution, the Initiator performs four Paillier encryptions: $E(1)$, $E(0)$, $E(z)$ and rand=$E(0,w)$ where w is a random value chosen with the same size as the Paillier modulus. To create vector $\vec{v_1}$, the Initiator selects the encryptions $E(0)$, $E(1)$ or $E(z)$ and multiplies them by a different rand to perform re-randomization. Alternatively, in one embodiment, to create the vectors, the Initiator can use a pool of pre-computed $E(0)$'s. Thus, the Initiator computes (2·m·$\tau$) multiplications (to create $\{\vec{v_1}, \ldots, \vec{v_m}\}$), and at most $\tau$ decryptions (to retrieve suitable timeslots). In one embodiment, all other participants perform two encryptions ($E(0)$ and rand) and (2·m·$\tau$) multiplications to update the vectors. The server performs (m·$\tau$) exponentiations for the tagging and (m·$\tau$) multiplications to create vector $\vec{q}$. Communication overhead amounts to (m·$\tau$) ciphertexts for all participants. Additionally, the Initiator receives $\tau$ ciphertexts (in $\vec{q}$).

FIG. 5 is a ladder diagram that illustrates a sequence of messages and processes for preserving privacy using parallel scheduling, according to one embodiment. A network process is represented by a thin vertical line. A step or message passed from one process to another is represented by horizontal arrows. The processes represented in FIG. 5 are the participating UEs 103a-103n (e.g., $P_1$-$P_N$) and the scheduling platform 101.

In one embodiment, prior to beginning the process of FIG. 5, each participant $P_i$ (e.g., the UEs 103a-103n) computes public/private keypairs ($PK_i$, $SK_i$). By way of example, public keys, $PK_i$ are distributed, before protocol execution, using the scheduling platform 101 (e.g., server S).

In step 501, the Initiator $P_1$ computes a mapping, MAP, and sends it to the server S. In one embodiment, S uses the mapping during aggregation to transform each aggregated cost into the corresponding vbr. Assuming $N_{max}$ is the maximum number of participants, $\tau$ max=$f(c_{max}, N_{max})$, and $(a_1, y_1)$ are random values in the Paillier setting generated by $P_1$, MAP is pre-computed by $P_1$ as follows:

$$E(0, a_1) \longrightarrow [E(1), E(z), E(z), E(z), \ldots, E(z)]$$

$$E(1, a_1 y_1) \longrightarrow [\underbrace{E(0)}_{1}, E(1), E(z), E(z), \ldots, E(z)]$$

$$\ldots \longrightarrow \ldots$$

$$E(\tau_{max}, a_1 y_1^{\tau_{max}}) \longrightarrow [\underbrace{E(0), E(0), E(0), E(0), \ldots, E(0)}_{\tau_{max}}].$$

In one embodiment, $y_1$ and $a_1$ randomize the mapping and prevent S from learning any private information. By way of example, $y_1$ is raised to the value of the aggregated costs in order to randomize the costs differently. Since $(y_1)^0 = 1$, the random value $a_1$ is added to address the special case where an aggregated cost equals 0. In addition, $a_1$ simplifies future updates: $P_i$ would only need to change this random value to re-randomize the mapping without performing exponentiations again. Finally, in one embodiment, $P_i$ shuffles the mapping to randomize the position of each aggregated cost.

More specifically, $P_1$ picks a random $r_1$, then, for each time slot $j \in [1,m]$, computes and sends S the value $ec_{1:j}$:

$$ec_{1:j} = E(c_{1:j}, a_1 \cdot (r_1)^j \cdot (y_1) c_{1:j}) =$$
$$= E(c_{1:j}, a_1) \cdot (E(0, r_1))^j \cdot (E(0, y_1))^{c_{1:j}}.$$

Next, $P_1$ picks N−1 random values, $(x_2, \ldots, x_N)$. For each $i \in [2,N]$, $P_1$ encrypts $<x_i, E(0, y_1)>$ under the public key $PK_i$ of each participant $P_i$ and sends them to S, which forwards to the corresponding participant(s) (step 503). In one embodiment, this encryption hides these values from the server S. Finally, $P_1$ computes $er_1 = E(-\Sigma_{i=2}^{N} x_i), r_1)$ and sends it to S.

First, each participant $P_i$ generates a random value $r_i$ in the Paillier setting generated by $P_1$. Then, for each timeslot $j \in [2,m]$, $P_i$ encrypts the cost $c_{i:j}$, using as randomness the decrypted $E(0, y_1)$:

$$ec_{i:j} = E(c_{i:j}, r_i \cdot (y_1)^{c_{i:j}})$$
$$= E(c_{i:j}, 1) \cdot (E(0, r_i))^j \cdot (E(0, y_1))^{c_{i:j}}$$

Then, $P_i$ sends S $\{e_{ci:1}, \ldots, e_{ci:m}\}$ and $E(x_i, r_i)$ (step 505). Next, S computes the (encrypted) aggregated cost of each timeslot $j \in [2,m]$, using Paillier's homomorphism:

$$eac_j \stackrel{\text{def}}{=} \Pi_{i=1}^{N} ec_{i:j} = E(ac_j, (ar)^j \cdot a_1 \cdot (j_1)^{ac_j})$$

where $ar \stackrel{\text{def}}{=} \Pi_{i=1}^{N} r_i \mod n^2$ (n begin the public Paillier modulus of $PK_1$). Finally, S reconstructs:

$$E(0, ar) = E\left(-\left(\sum_{i=2}^{N} x_i\right), r_1\right) \cdot E(x_2, r_2) \cdot \ldots \cdot E(x_N, r_N)$$

After the reconstruction, the server S computes, for instance, the (encrypted) minimum aggregated cost and sends it to $P_1$ (step 507). To this end, S first transforms each encrypted aggregated cost ($eac_j$) into its vbr. Next, S computes the vbr using the mapping MAP and the value $E(0, ar)$, namely, for each timeslot $j \in [1,m]$, S:

(i) Multiplies the first column of MAP by $E(0, ar)$ and gets: (recall that the position of each aggregated cost is shuffled in the mapping stored by the server).

$$E(0, ar^j a_1) \rightarrow [E(1), E(z), E(z), E(z), \ldots, E(z)]$$
$$E(1, ar^j a_1 \cdot y_1) \rightarrow [\underbrace{E(0)}_{1}, E(1), E(z), E(z), \ldots, E(z)]$$
$$\ldots \rightarrow \ldots$$
$$E(\tau_{max}, ar^j a_1 y_1^{\tau_{max}}) \rightarrow [\underbrace{E(0), E(0), E(0), E(0), \ldots, E(0)}_{\tau_{max}}].$$

(ii) Finds $eac_j$ in MAP and stores the right side of the mapping as $\vec{v_j}$.

(iii) Increments j and goes back to (i). Next, S starts the homomorphic argmin using vectors $\vec{v_j}$, i.e., the vbr of each aggregated cost, leveraging the following tagging technique. The server raises each element of $\vec{v_j}$ to $2^j$ (for $j \in [1,m]$):

$$\vec{v_j'} = (\vec{v_j})^{2^j} = [(v_{j,1})^{2^j}, (v_{j,2})^{2^j}, \ldots, (v_{j,\tau})^{2^j}]$$

Then, the server S computes the vector $\vec{q}$ and sends it to $P_1$:

$$\vec{q} = [q_1, q_2, \ldots, q_\tau]$$
$$\stackrel{\text{def}}{=} \left[\prod_{j=1}^{m} v_{j,1}', \ldots, \prod_{j=1}^{m} v_{j,\tau}'\right]$$

-continued
$$= [\underbrace{E(0), \ldots, E(0)}_{min}, q_{min+1}, \ldots, q_\tau]$$

Finally, $P_1$ decrypts each element of $\vec{q}$ using $SK_1$. Similar to the process of FIG. 4, in one embodiment, the minimum aggregated cost corresponds to the number of consecutive 0's in the first positions of $\vec{q}$. $q_{min+1}$ decrypts to the sum of tags corresponding to the timeslot(s) producing the minimum aggregated cost. By way of example, this sum is denoted with $\phi$. $P_1$ retrieves the index of this timeslot by observing which bits are equal to 1 in the binary decomposition of $\phi$. $P_1$ may additionally retrieve the second minimum timeslot by subtracting ($\phi \cdot z$) from the nonnull decrypted elements of $\vec{q}$. Iterating this method leads to retrieval of all timeslots with aggregated cost smaller than $\tau$. At the end of the protocol, only $P_1$ learns the timeslots with aggregated cost smaller than the threshold, and takes appropriate actions to schedule the meeting. Again, standard encryption techniques can be used by $P_1$ to multicast meeting invitation to the other participants.

In one embodiment, during each protocol execution, the Initiator performs, in the worst case, $(c_{max}+3)$ Paillier encryptions and $(c_{max}+3 \cdot m)$ multiplications to create $j \in [1,m]$ (e.g., using the randomization with rand as mentioned with respect to FIG. 4). In addition, Initiator needs $N-1$ Paillier encryptions to protect $\langle x_i, E(0, y_i) \rangle$, and at most $\tau$ decryptions to retrieve suitable timeslots. Each participant performs one decryption to get $\langle (x_i, E(0, y_1) \rangle$, and $(c_{max}+1)$ Paillier encryptions plus $(c_{max}+3 \cdot m)$ multiplications to create encrypted costs. In one embodiment, the server S performs $(m \cdot \tau)$ exponentiations for tagging and $(m \cdot \tau)$ mults to create $\vec{q}$. Communication overhead amounts to m ciphertexts for all participants. Additionally, the Initiator receives $\tau$ ciphertexts (in $\vec{q}$).

Figure 6A:
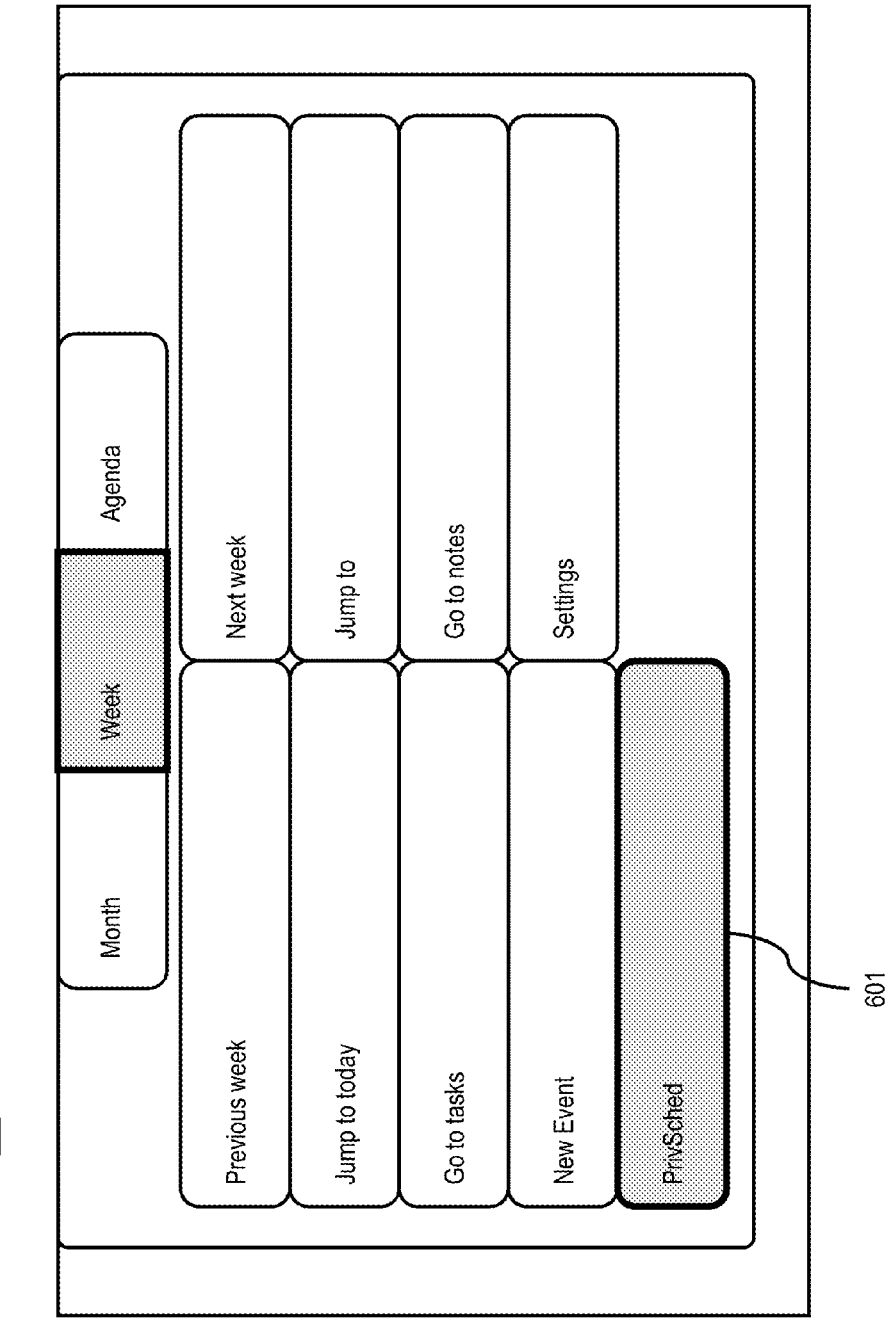
Figure 6B:
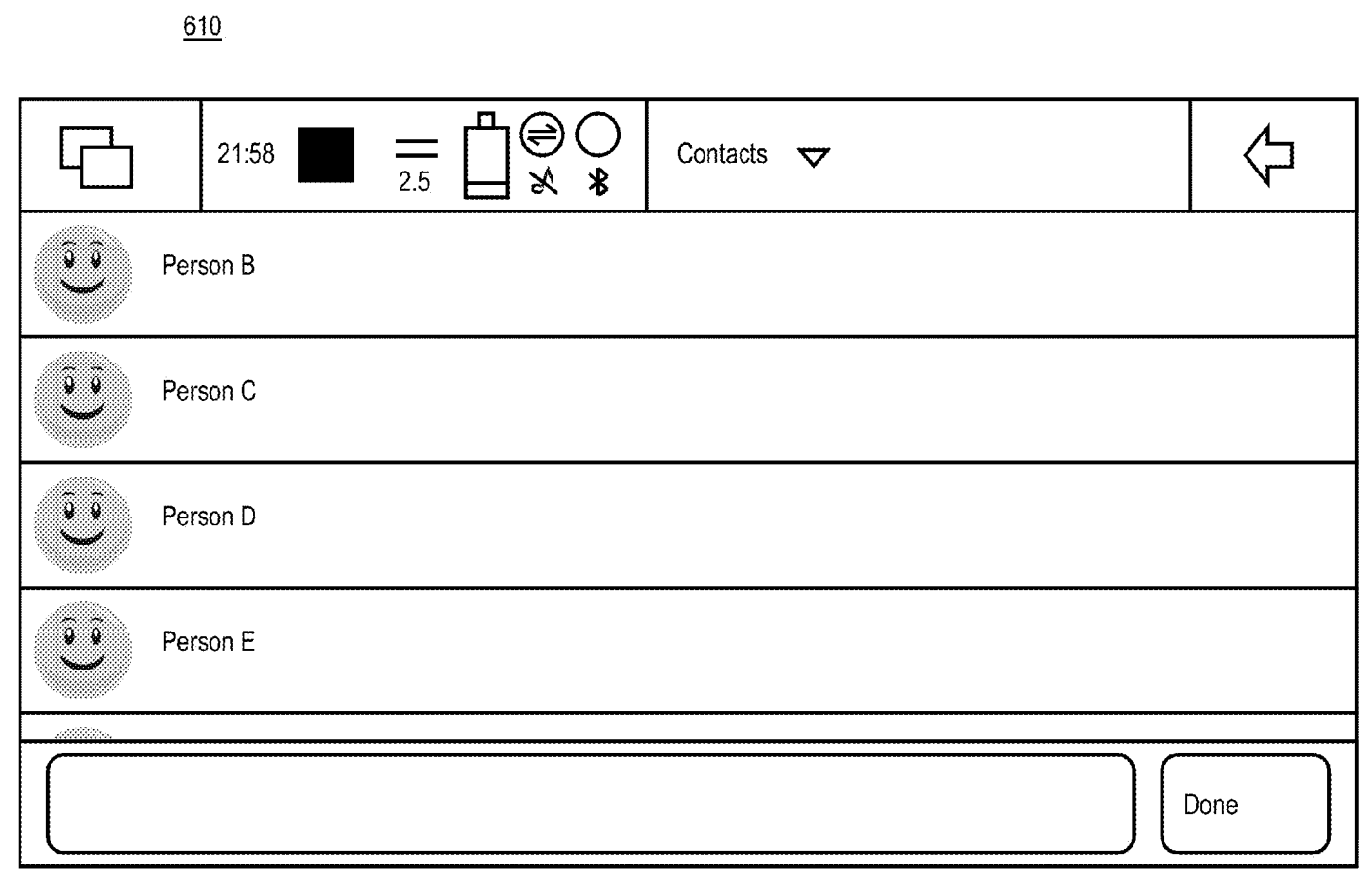
Figure 6C:
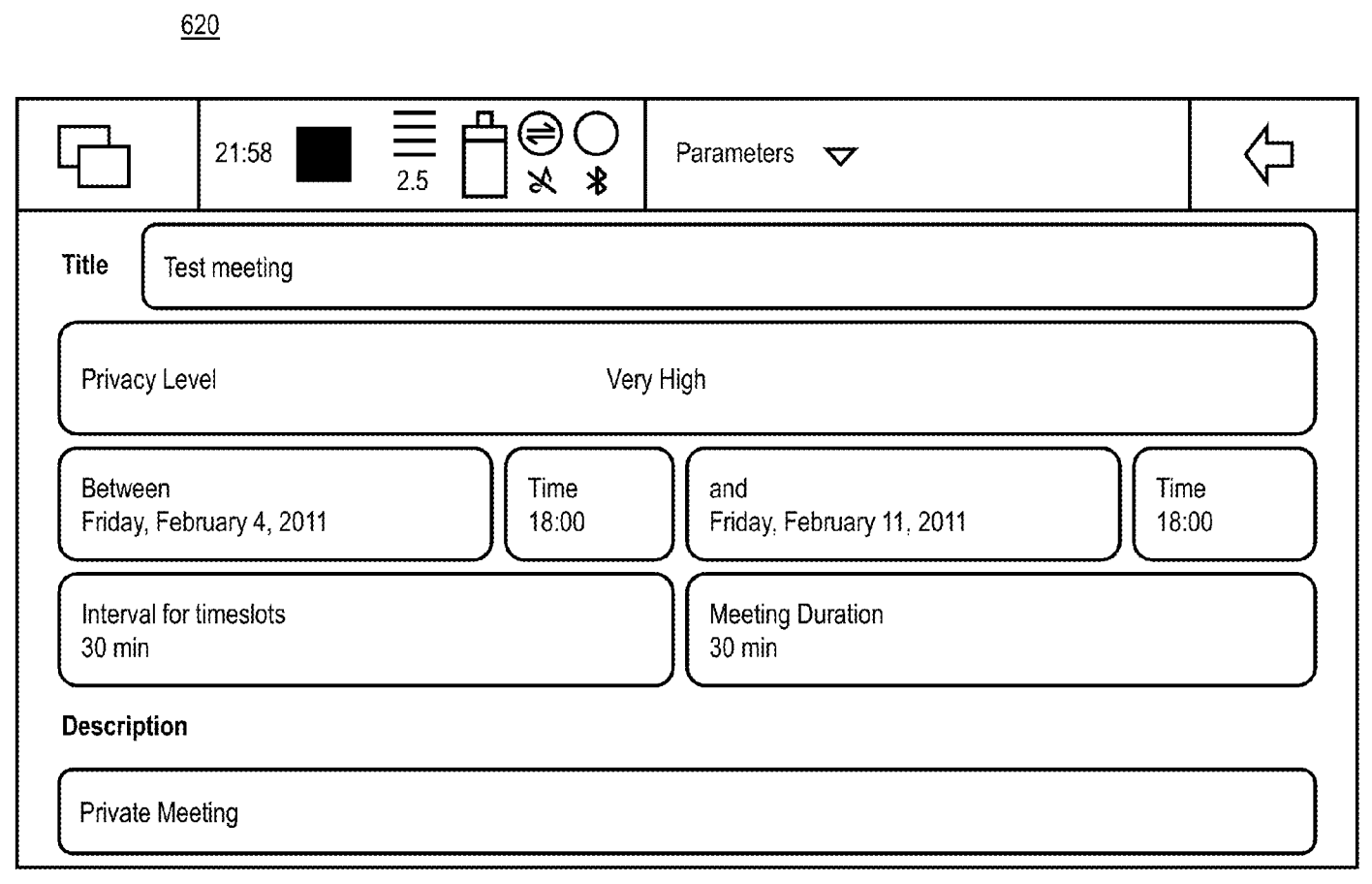
Figure 6E:
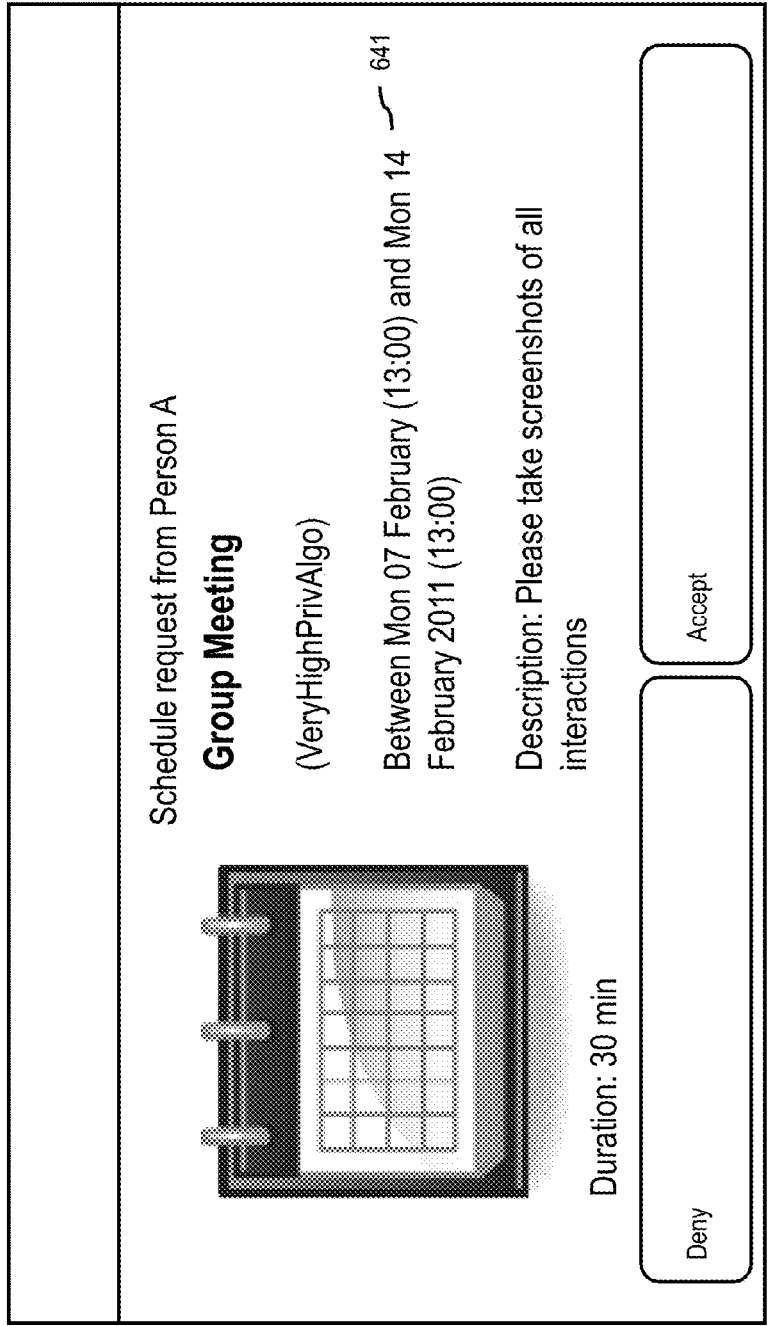

FIGS. 6A-6I are diagrams of user interfaces utilized in the processes of FIGS. 1-5, according to various embodiments. The user interfaces of FIGS. 6A-6H represent a sample use case in which Person A wants to invite Persons B, C, D, etc. for a meeting. Person A goes to his mobile phone calendar application and accesses a scheduling menu. FIG. 6A depicts a user interface (UI) 600 of the scheduling menu which provides an option 601 to initiate privacy-preserving meeting scheduling. In this example, Person A selects the option 601 to bring up a UI 610 of FIG. 6B that presents a list of contacts whom Person A can invite to attend the meeting.

Person A can then choose one or more of the contacts in the UI 610 to invite. On making this selection, the UI 620 of FIG. 6C is presented to enable Person A to specify meeting parameters and/or criteria. For example, UI 620 enables Person A to specify a title, privacy level, importance level, date and time range to search, time slot intervals, meeting duration, and a general description of the meeting.

On entering the meeting parameters in the UI 620, Person A is presented with the UI 630 of FIG. 6D to initiate the privacy-preserving scheduling process. For example, UI 630 provides a status 631 of the scheduling process and an option 633 to schedule the meeting based on the recommended time slots. Concurrently, the meeting invitees (e.g., Person B) are presented with the UI 640 of FIG. 6E to notify them of the meeting request with a potential date range 641 specified. In this case, the invited users are prompted in order to check if they accept or deny such a meeting, and the users do not have to deal with finding an available timeslot in their calendar. Instead, on accepting the meeting, their availability information (encrypted availability information) is sent to the scheduling platform 101 which computes (e.g., in a privacy preserving manner) the recommended (e.g., earliest or least costly) common timeslot.

Figure 6F:
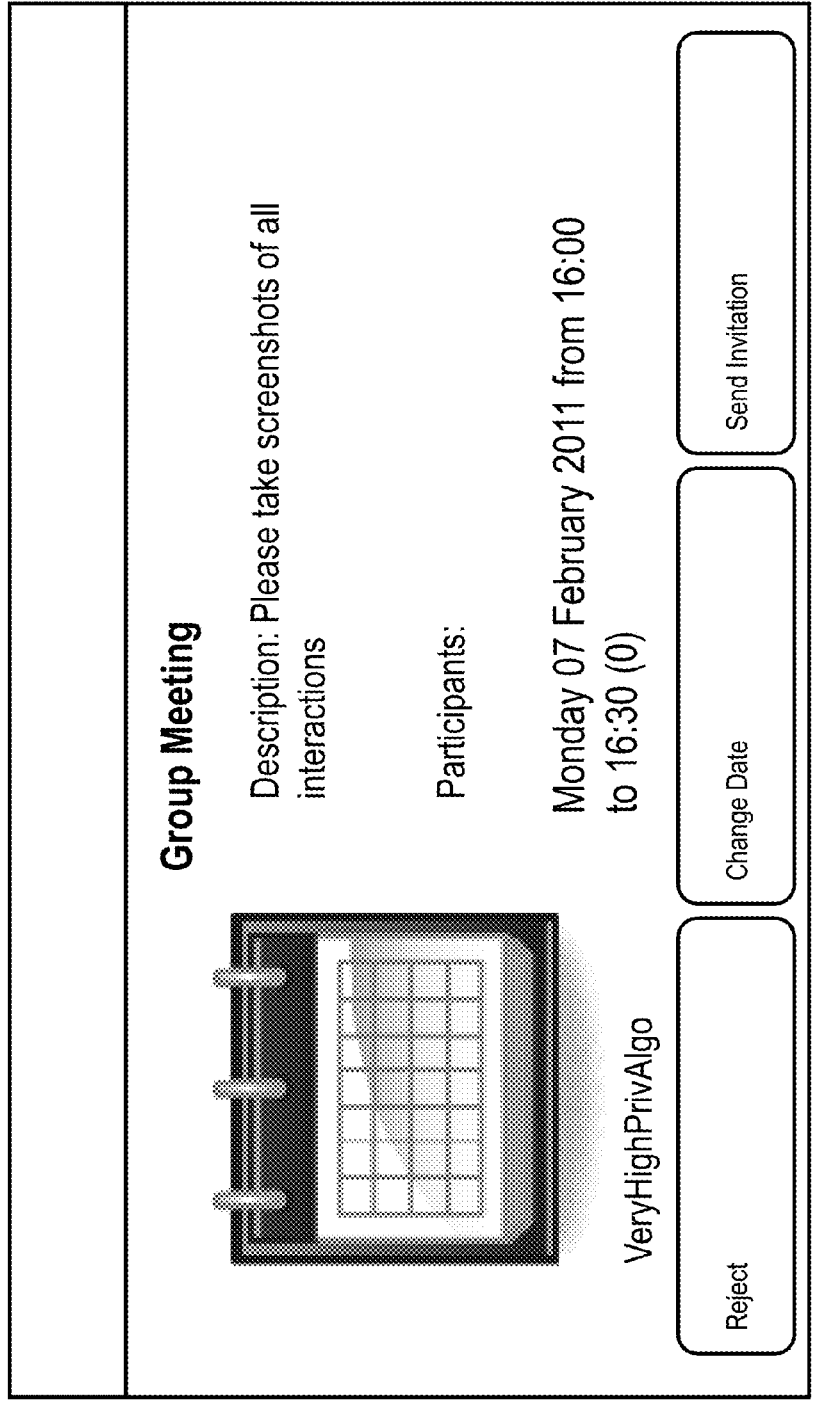
Figure 6G:
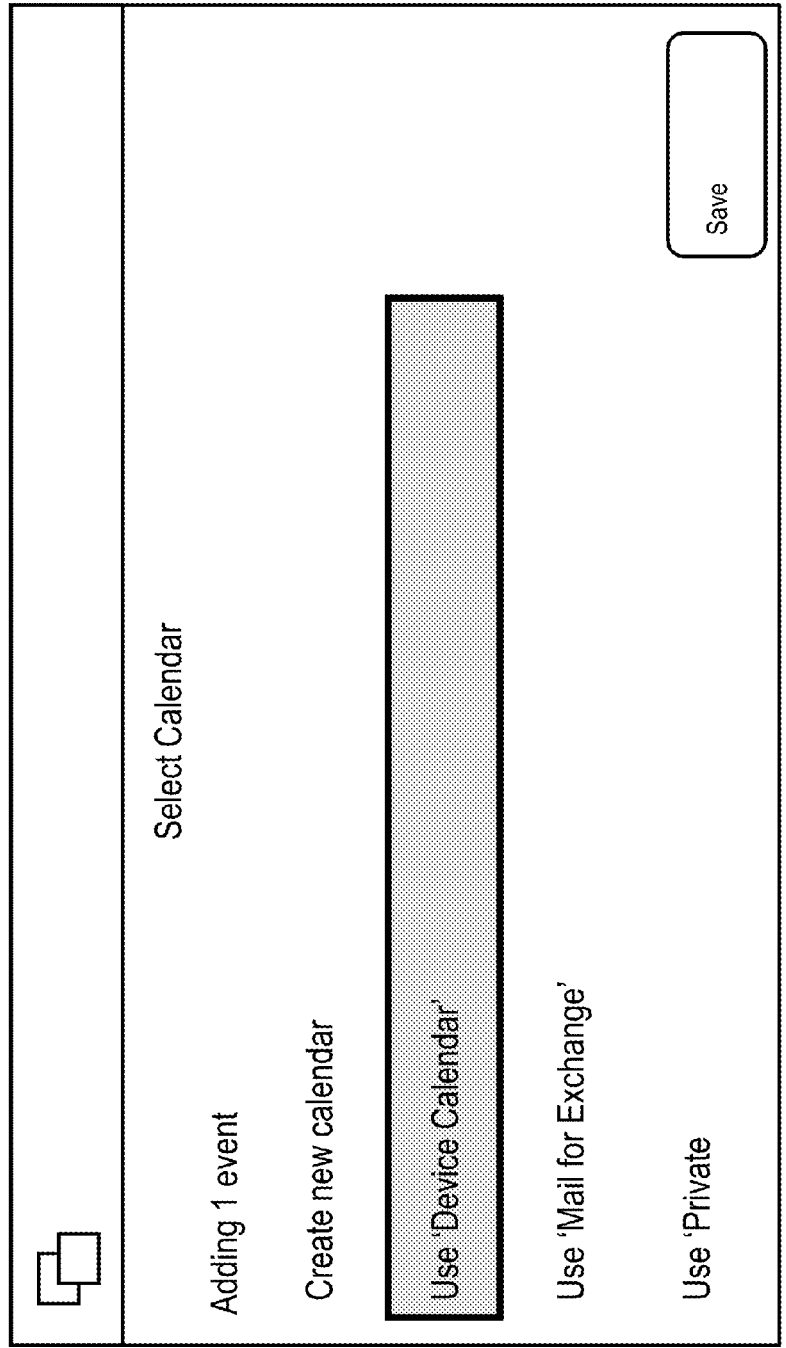

The UI 650 of FIG. 6F presents the results of the privacy-preserving scheduling process to Person A. In this case, a recommended timeslot is provided. Person A can then either reject, change the date, or accept the meeting to send invitations to the meeting invitees. On deciding to send invitations, Person A also can presented with an option to include the meeting in Person A's calendar or other PIM application on the user's device as shown in the UI 660 of FIG. 6G. In one embodiment, Person A can also be requested to assign a cost rating or weight to the time slot as shown in the UI 670 of FIG. 6H. This scheduling platform 101 can then use this cost rating to refine its recommendations for scheduling future appointments.

Figure 6I:
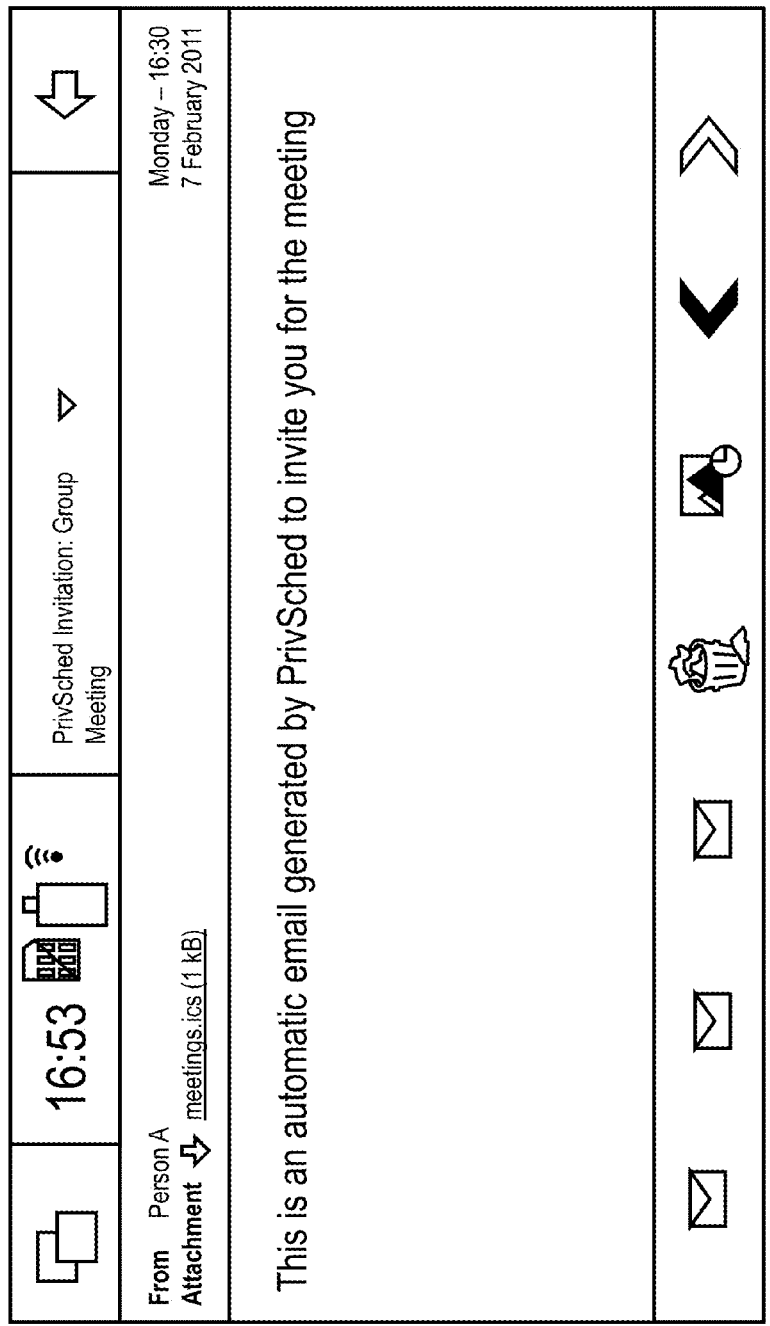

Finally, as shown in the UI 680 of FIG. 6I, invitations can be sent to the potential meeting attendees in an email. In one embodiment, the email may include the appointment date and time in standard calendar format (e.g., .ics format) so that the invitee can click on the link to automatically insert the appointment into the invitees' calendar applications.

The processes described herein for preserving privacy for appointment scheduling may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
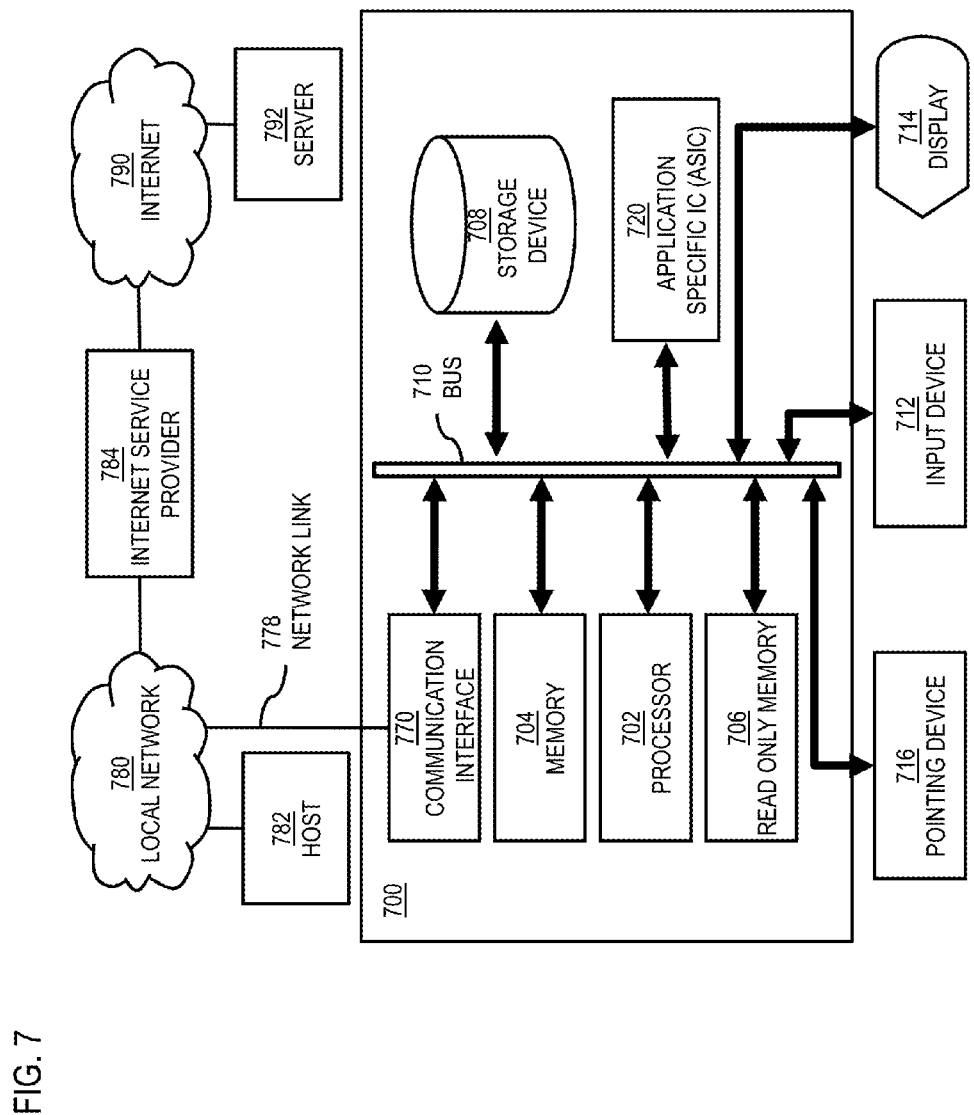
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to preserve privacy for appointment scheduling as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of preserving privacy for appointment scheduling.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to preserving privacy for appointment scheduling. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for preserving privacy for appointment scheduling. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for preserving privacy for appointment scheduling, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for preserving privacy for appointment scheduling.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
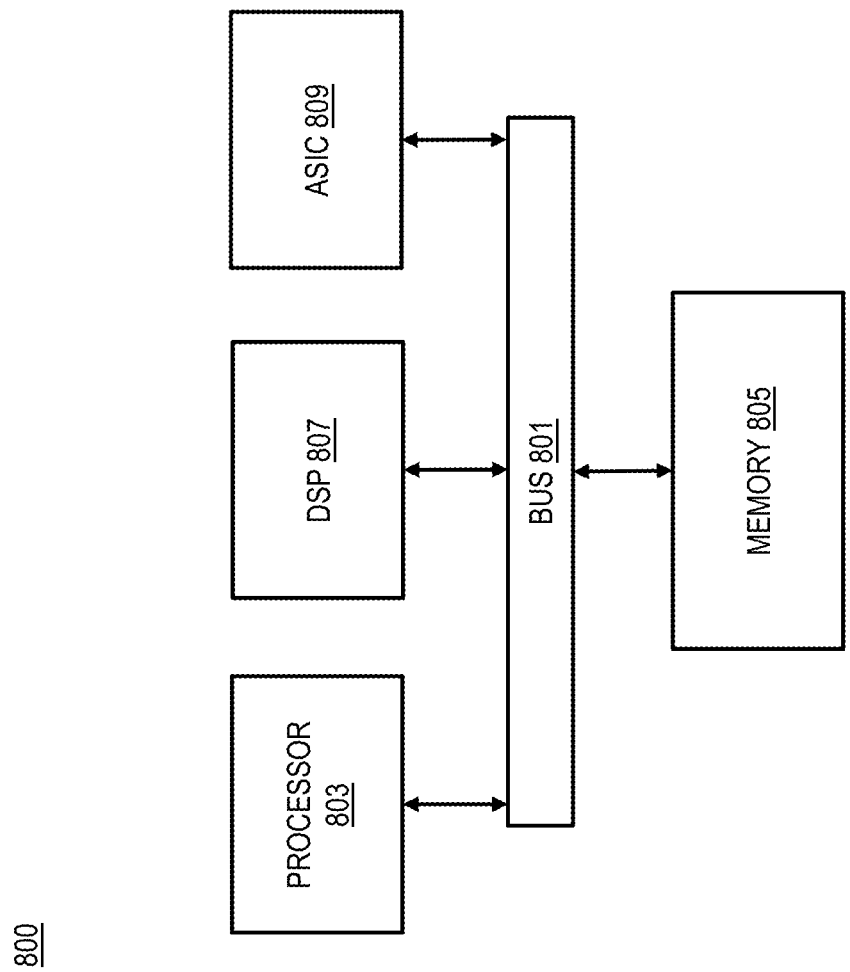
FIG. 8 is a diagram of a chip set that can be used to implement an embodiment of the invention.

FIG. 8 illustrates a chip set or chip 800 upon which an embodiment of the invention may be implemented. Chip set 800 is programmed to preserving privacy for appointment scheduling as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of preserving privacy for appointment scheduling.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to preserve privacy for appointment scheduling. The memory 805 also stores the data associated with or generated by the execution of the inventive steps.

Figure 9:
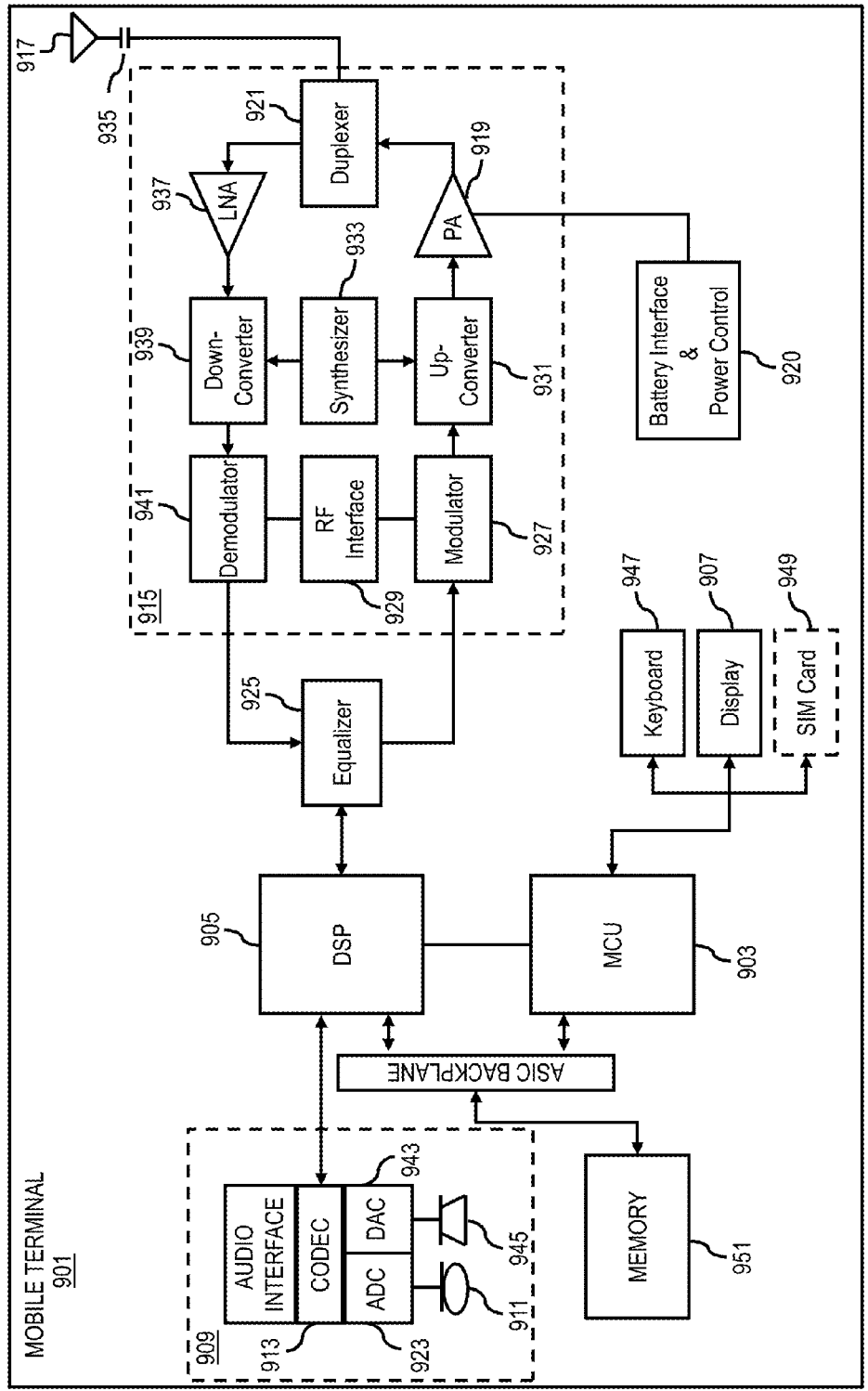
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of preserving privacy for appointment scheduling. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of preserving privacy for appointment scheduling. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to preserving privacy for appointment scheduling. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

a request to schedule an appointment among one or more users;

a plurality of responses to the request, one or more of the plurality of responses being associated with one or more of the one or more users;

a processing of the plurality of responses to determine availability information for the one or more users, wherein the processing randomizes the plurality of responses and the availability information is encrypted using homomorphic encryption; and a processing of the availability information using, at least in part, one or more homomorphic functions to determine one or more recommended time slots for the appointment.

2. A method of claim 1, wherein the availability information is, at least in part, non-binary, and wherein the (1) data and/or (2) information and/or (3) at least one signal are further based, at least in part, on the following:

a processing of the availability information using one or more cost functions to determine the one or more recommended time slots.

3. A method of claim 2, wherein the (1) data and/or (2) information and/or (3) at least one signal are further based, at least in part, on the following:

one or more threshold criteria for the one or more cost functions, wherein the one or more recommended time slots are determined based, at least in part, on the one or more threshold criteria.

4. A method of claim 2, wherein the (1) data and/or (2) information and/or (3) at least one signal are further based, at least in part, on the following:
a profile, a policy, or a combination thereof associated with the at least one of the one or more users; and
a processing of the profile, the policy, or a combination thereof to determine or to modify one or more parameters of the one or more cost functions.

5. A method of claim 2, wherein the (1) data and/or (2) information and/or (3) at least one signal are further based, at least in part, on the following:
context information, historical appointment information, user behavior information, or a combination thereof associated with at least one of the one or more users; and
a processing of the context information, the historical appointment information, the user behavior information, or a combination thereof to determine or to modify one or more parameters of the one or more cost functions.

6. A method of claim 2, wherein the (1) data and/or (2) information and/or (3) at least one signal are further based, at least in part, on the following:
acceptance information, attendance information, or a combination thereof of the appointment; and
a processing of the acceptance information, attendance information, or a combination thereof to determine or to modify one or more parameters of the one or more cost functions.

7. A method of claim 2, wherein one or more parameters of the one or more cost functions include, at least in part, a user cost rating for attending the appointment, a resource level associated with attending the appointment, an importance level of the appointment, a location of the appointment, or a combination thereof.

8. A method of claim 2, wherein the (1) data and/or (2) information and/or (3) at least one signal are further based, at least in part, on the following:
an input from at least one of the one or more users for specifying one or more cost ratings of the one or more recommended time slots; and
a processing of the one or more cost ratings to determine one or more cost parameters for one or more subsequent applications of the one or more cost functions.

9. A method of claim 1, wherein the (1) data and/or (2) information and/or (3) at least one signal are further based, at least in part, on the following:
one or more potential locations for the appointment;
a processing of the availability information to determine at least one recommended location from the one or more potential locations.

10. A method of claim 1, wherein the one or more recommended time slots include, at least in part, an earliest available time slot, a time slot during which a predetermined number of the one or more users can attend, a time slot at least substantially meeting one or more selection criteria, or a combination thereof.

11. A method of claim 1, wherein the one or more homomorphic functions output the one or more recommended time slots in an encrypted state, and wherein the processing is performed by a server component independent of the one or more respective devices of the one or more users.

12. An apparatus comprising:
at least one processor; and
at least one memory including computer program code for one or more programs,
the at least one memory and the computer program code configured to, with the at least one processor, cause the apparatus to perform at least the following,
receive a request to schedule an appointment among one or more users;
determine a plurality of responses to the request, one or more of the plurality of responses being associated with one or more of the one or more users;
process and/or facilitate a processing of the plurality of responses to determine availability information for the one or more users, wherein the processing and/or facilitating of the processing randomizes the plurality of responses and the availability information is encrypted using homomorphic encryption; and
process and/or facilitate a processing of the availability information using, at least in part, one or more homomorphic functions to determine one or more recommended time slots for the appointment.

13. An apparatus of claim 12, wherein the availability information is, at least in part, non-binary, the method further comprising:
processing and/or facilitating a processing of the availability information using one or more cost functions to determine the one or more recommended time slots.

14. An apparatus of claim 13, wherein the apparatus is further caused to:
receiving one or more threshold criteria for the one or more cost functions,
wherein the one or more recommended time slots are determined based, at least in part, on the one or more threshold criteria.

15. An apparatus of claim 13, wherein the apparatus is further caused to:
determining a profile, a policy, or a combination thereof associated with the at least one of the one or more users; and
processing and/or facilitating a processing of the profile, the policy, or a combination thereof to determine or to modify one or more parameters of the one or more cost functions.

16. An apparatus of claim 13, wherein the apparatus is further caused to:
determining context information, historical appointment information, user behavior information, or a combination thereof associated with at least one of the one or more users; and
processing and/or facilitating a processing of the context information, the historical appointment information, the user behavior information, or a combination thereof to determine or to modify one or more parameters of the one or more cost functions.

17. An apparatus of claim 13, wherein the apparatus is further caused to:
determining acceptance information, attendance information, or a combination thereof of the appointment; and
processing and/or facilitating a processing of the acceptance information, attendance information, or a combination thereof to determine or to modify one or more parameters of the one or more cost functions.

18. An apparatus of claim 13, wherein one or more parameters of the one or more cost functions include, at least in part, a user cost rating for attending the appointment, a resource level associated with attending the appointment, an importance level of the appointment, a location of the appointment, or a combination thereof.

19. An apparatus of claim 13, wherein the apparatus is further caused to:
    receiving an input from at least one of the one or more users for specifying one or more cost ratings of the one or more recommended time slots; and
    processing and/or facilitating a processing of the one or more cost ratings to determine one or more cost parameters for one or more subsequent applications of the one or more cost functions.

20. An apparatus of claim 12, wherein the apparatus is further caused to:
    determining one or more potential locations for the appointment;
    processing and/or facilitating a processing of the availability information to determine at least one recommended location from the one or more potential locations.

* * * * *